(12) United States Patent
O'Toole et al.

(10) Patent No.: US 7,117,273 B1
(45) Date of Patent: Oct. 3, 2006

(54) METHODS AND APPARATUS FOR MAINTAINING A MAP OF NODE RELATIONSHIPS FOR A NETWORK

(75) Inventors: James O'Toole, Somerville, MA (US); John H. Jannotti, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 882 days.

(21) Appl. No.: 09/752,842

(22) Filed: Dec. 29, 2000

Related U.S. Application Data

(60) Provisional application No. 60/177,985, filed on Jan. 25, 2000.

(51) Int. Cl.
*G06F 15/16* (2006.01)

(52) U.S. Cl. .................. 709/252; 709/239; 370/408

(58) Field of Classification Search ........ 709/220–224, 709/238–239, 242, 252; 707/10, 104; 370/254, 370/408; 714/786
See application file for complete search history.

(56) References Cited

U.S. PATENT DOCUMENTS 5,941,955 A * 8/1999 Wilby et al. ................ 709/242
6,134,599 A * 10/2000 Chiu et al. .................. 709/252
6,687,222 B1 * 2/2004 Albert et al. ............... 370/230

\* cited by examiner

*Primary Examiner*—Andrew Caldwell
*Assistant Examiner*—Hieu Le
(74) *Attorney, Agent, or Firm*—BainwoodHuang

(57) ABSTRACT

The invention is directed to techniques for maintaining a map of node relationships for a network of nodes (e.g., network of computers). In one example, the map of node relationships represents relationships overlaying and typically different from the network of physical connections among the nodes. Each child node periodically checks in with its parent nodes, and the parent nodes can thus determine when a child node has terminated a relationship with the parent or created a new relationship with a new parent. Changes in relationships propagate upward through the network of nodes so that each node maintains a map of the relationships among the descendants of that node. A root node receives the propagated change relationship information and maintains a map of the entire network and valid pathways through the network. The root node can use the map when responding to a request from a client to receive services from a node in the network and redirects the client to attach to a node in the network that has a valid path to the root node. The root node can then broadcast data (e.g. a stream of video data) throughout the network, which is received by all the clients attached to nodes in the network.

20 Claims, 10 Drawing Sheets

METHODS AND APPARATUS FOR MAINTAINING A MAP OF NODE RELATIONSHIPS FOR A NETWORK

CROSS REFERENCE TO RELATED APPLICATIONS

This application claims priority from U.S. Provisional Patent Application No. 60/177,985, filed Jan. 25, 2000, entitled "Fast Changing Network Status and Load Monitoring and Feedback," the disclosure of which is incorporated in its entirety herein by reference.

BACKGROUND OF THE INVENTION

Historically, computers communicated over dedicated communication lines or through specific connections such as a modem connection from one computer to another. Computers have also been connected in networks that allow communication among a number of computers. If a computer is added or removed from the network, typically a human operator notifies a dedicated network application of the addition or removal. In another conventional approach, a specialized network administration node tracks the changes to the network.

In a modern network, such as the Internet based on IP (the Internet Protocol), a human operator can add or remove a computer (e.g., a server serving the World Wide Web or web site) from the network. Another computer (e.g., client) is not necessarily aware of the change. It is possible for clients to use monitoring software applications or routines to keep track of the availability of a remote web site by regularly checking the site. For example, the monitoring software application can use a "ping" command to check on the status of a particular server serving a web site.

In many conventional systems, clients are interested in maintaining or understanding pathways that connect with other computers. The status of the pathway may be based on virtual connections, as well as the physical connections between computers. In a network like the Internet, a virtual connection between computers may be viewed as one data communications connection or pathway based on one or more physical connections between the computers. For example, one client computer can make a virtual connection to a server computer by referencing an HTTP (Hypertext Transfer Protocol) hyperlink in one web page to the server. The client and server computers can be located in the same building. Alternatively, the two computers may be located in different cities. In this case, the physical connections between the two computers may pass through many intermediate computers (e.g., many nodes or hops on the Internet) while the virtual connection is viewed as one connection (e.g., between a web site served by the client and the server computer).

A pathway between two computers can be established or interrupted due to the change of a physical connection or due to the change of a virtual connection. In conventional systems of very large networks, such as the Internet, computers are often not aware of a change in the status of other computers connected to the network until they try to access a computer and then discover a change, such as a removal of the computer from the network.

SUMMARY OF THE INVENTION

In conventional systems, such as described above, a node (e.g., computer or network device) is not necessarily aware of the status of another node on the network. Typically, a human operator or network administration node (e.g., a network management computer equipped with network management software) attempts to track the changes, such as by repeated communications to every other node to check their status. These repeated communications can be a burden on the network administration node, especially for very large networks, such as the Internet, or other networks with a large number of nodes. The network administration node or other monitoring node may be burdened by repeated communications to the point that performance of this node or the network declines and/or the status information regarding other nodes becomes out of date.

In conventional systems, a node in a network may change its location in the network (e.g., virtual or physical connections to other nodes) for various reasons, such as the unavailability of other nodes, an attempt to find less congested pathways through the network, or for other reasons. However, such changes may not be automatically relayed to other nodes on the network, even in the case of other nodes that a client communicates with frequently. For example, a client may communicate frequently with a web site, and yet discover that the web site is unavailable only after trying to access the web site with a request (e.g., an HTTP request).

In contrast, the present invention provides mechanisms and techniques that allow a network of nodes (either a physical network or virtual network overlaid on a physical network) to maintain awareness of the relationship status of other nodes in the network. In a sense, the invention provides a type of node-awareness protocol that allows a network of nodes (e.g., that may be arranged in a hierarchical manner such as a tree) to detect relationship changes between nodes in the network (e.g., in the tree hierarchy) and to propagate such relationship changes to other nodes in the network (e.g., in the tree). By way of an example using a network of nodes have a hierarchical or tree relationship, if a child node changes its relationship with a parent node of that child (e.g., the child node becomes connected or associated with, or disconnected or disassociated from) a parent node, the invention provides techniques and mechanisms for the parent node to indicate such a change to upper level nodes in the tree, such as a direct parent of the parent of the child, and then to a parent of that parent, and so forth up to a root node in the tree.

More specifically, in the approach of the invention, nodes (e.g. computers in a network) in relationships with other nodes in a network, node tree or graph, maintain maps of the relationships. The relationships may represent physical connections among nodes that are computers or other networked devices or logical relationships in an overlay network, in which the logical relationships among nodes in the overlay network typically do not conform to the physical connections among the computers (e.g., the logical relationships represent virtual connections). The nodes in the network propagate change information (e.g., change relationship signals) up the node tree. For example, the node tree includes a root node that may be connected to several nodes in the tree, which are parent nodes to lower level nodes (i.e., child nodes). The root node receive change information (e.g., information conveying a node relationship change), and the nodes in the tree can filter out redundant or unnecessary change information so that higher level nodes and the root only receive a minimal amount of information and are not overwhelmed with a large number of change relationship communications from every node in the node tree.

The root can receive change information, because each child node in the node tree periodically checks in with its parent and reports its status to the parent, as well as information on the status of descendants of the child in the network. For example, a new parent of a child reports a creation signal (e.g., creation of a relationship between the node and a child) when a child node connects to a new parent node. A parent node can also generate a termination relationship signal (e.g., termination of a relationship between the node and a child) when one of its child nodes ends the relationship with the parent node (e.g. stops checking in). At a higher level in the tree, if an intermediate node (e.g., parent node intermediate between lower level parents and the root) receives several creation and termination signals for a lower level node (e.g., a child node that has moved several times), it can report only the most recent creation and termination signals to higher level nodes in the network. Thus, the root only receives the creation and termination signals that are most recent for a given node (e.g., child node).

The relationships of interest can be physical connections (e.g., connection or disconnection of a physical cable connecting to the network), data communication links (e.g., establishment or termination of a TCP connection over a physical network) or virtual connections (e.g., creation or destruction of a hyperlink over the web). If a node is unable to communicate with another node (e.g., a parent of that node) or the computer for the node has shut down, then the logical relationship to that node may be unavailable. Thus, the root node is not overwhelmed in a very large network (e.g., thousands of nodes) with receiving many creation and termination signals communicated directly to the root node of many disconnections or connections of a large number of child nodes.

In one environment suitable for use with the invention, a root node provides content that is broadcast (e.g., "overcast") over nodes in a network, such as video data broadcast over a group of nodes in the Internet. In the approach of the invention, a root node maintains a map of the nodes in the group. Nodes in the network may change their relationships, for example, to optimize pathways through the network so as to dynamically optimize the efficiency of the network. If nodes move in the network, the root receives termination signals and/or creation signals that represent change information, and uses this change information to update the root's map of the network.

The root uses the map when communicating with a client. For example, if a client wishes to receive content (e.g., video) from the root, the root directs the client to attach itself (i.e., to form a data communications connection with) as a child node to one of the nodes (now acting as a parent node) in the network. The root can rely on the change information that it has been maintaining to choose a parent node for the client that has an active pathway from the root to the parent node. The root can then broadcast the content (e.g., video) throughout the network. Thus, from its map, the root has reliable, recent information on the status of nodes in the network that allows it to choose a reliable pathway between the root and the client. The client can receive the content reliably without being required to investigate the status of every node in the pathway to the root. In addition, the techniques of the invention allow the root to use a very large network with reliable status information so that content information can be reliably provided to a very large number of clients, using many pathways through the network so that many clients can receive the content without any substantial performance degradation.

In one embodiment, the invention is directed to a method for maintaining a map of node relationships for a network of related nodes. The method includes detecting a change of a relationship between a first network node (e.g., intermediary node) and a second network node (e.g., child node) having a child relationship to the first network node, which functions as a parent to the second network node. The method also includes generating a change relationship signal indicating the change of the relationship between the first network node and the second network node, and transmitting the change relationship signal to a parent node of the first network node so that the parent node receives an update of a state of the relationship between the first network node and the second network node. Thus the parent node receives signals that keep the parent node aware of changes in the network when a lower level node moves around in the network, such as by disconnecting from one parent, and attaching to a new parent. The change relationship signals inform the parent of the current state of the network.

In another embodiment, the method includes generating the change relationship signal having a sequence number indicating a number of relationship changes of the second network node. Thus the parent node can use the sequence number to understand how many times a node has changed a relationship (e.g., how many times a node has changed its location in the network).

In a further embodiment, the sequence number is a count of parents of the second network node. The parent node can thus determine how many parents a node has had. If the parent node receives more than one change relationship signal for a node, then the parent node can use the parent count to determine which change relationship signal is valid (i.e., is the most recent signal).

The method, in another embodiment, includes updating the map of node relationships based on the change relationship signal such that the map of node relationships indicates the state of the relationship between the first network node and the second network node. Thus, the parent node can maintain a map that reflects the change in relationship.

In one embodiment, the method also includes receiving a propagated change relationship signal indicating a change in a relationship between two network nodes other than the first network node, and transmitting the propagated change relationship signal to the parent node, so that the parent node receives an update of a state of the relationship between the two network nodes. The first network node can serve as an intermediary and pass on changes in relationships between other nodes (e.g., lower level nodes in a node tree) to the parent node.

In another embodiment, the method includes updating the map of node relationships based on the propagated change relationship signal such that the map of node relationships indicates the state of the relationship between the two network nodes other than the first network node. The parent node can maintain a current (or recently updated) map of the state of the network, reflecting changes in the relationships of all the lower level nodes.

The method, in an additional embodiment, includes receiving propagated change relationship signals indicating a change of relationship between two network nodes, comparing the sequence numbers for the propagated change relationship signals, selecting one of the propagated change relationship signals with which to update the map of node relationships based on the step of comparing the sequence numbers, and transmitting the selected one of the propagated change relationships signals to the parent node, so that the parent node receives an update of a state of relationship between the two network nodes. Each propagated change relationship signal has a sequence number. For example, a node can filter out redundant signals such as creation signals indicating the attachment of a node to different parents and transmit only the most recent creation signal for that node, which reflects the current parent for that node (e.g., the most recent attachment to a parent).

In one embodiment, the change relationship signal is a termination signal indicating the termination of the relationship between the first network node and the second network node.

In another embodiment, the change relationship signal is a creation signal indicating the creation of the relationship between the first network node and the second network node.

In an additional embodiment, the method includes initiating a check-in communication from the second network node to the first network node. Thus, the child node initiates the communication with the parent and provides a report that reflects the child's status and any propagated change relationship signals from lower level nodes. This approach has the advantage of allowing child and lower level nodes to be located behind a firewall that the parent node cannot penetrate (e.g., cannot send signals through) and the parent node is not required to proactively contact each of its child nodes to determine its status and relationships.

In another embodiment, the invention is directed to a method for maintaining a map of node relationships for a network of related nodes. The method includes receiving a change relationship signal indicating a change in a relationship between a first network node and a second network node having a child relationship to the first network node, locating, in the map of node relationships, an entry corresponding to the second network node, and modifying the entry based on the change relationship signal so that the map of node relationships reflects the change in the relationship between the first network node and the second network node. Thus, the node (e.g., a root node for a network) receives the change relationship signals and uses them to maintain a current version of the map without being required to contact (e.g., poll) other nodes in the network (e.g., lower level nodes in a node tree) for their current status.

In another embodiment, the method also includes setting up a relationship to an alternate first network node capable of receiving the change relationship signal, and activating the alternate network node so that the alternate first network node receives the change relationship signal and performs the steps of locating the entry and modifying the entry. For example, the alternate network node can step in and serve as a root node for the network if the root node fails.

In a further embodiment, the method includes receiving a request for data, selecting a network node capable of responding to the request based on the map of node relationships and the request, and directing the request to the network node to provide a response to the request. If a client requests data from a root node, the root node can use the map to locate a node in the network that has an active path through the network between the node and the root. The root node can then direct the client to the node that the root located in the map.

Embodiments of the invention also include computer program products such as disks, or other readable media that have a computer-readable medium including computer program logic instructions encoded thereon for maintaining a map of node relationships according to the methods and configurations explained above. Such instructions, when executed on a processor on a computerized device (e.g., network node), cause the processor to perform any or all of the aforementioned methods.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
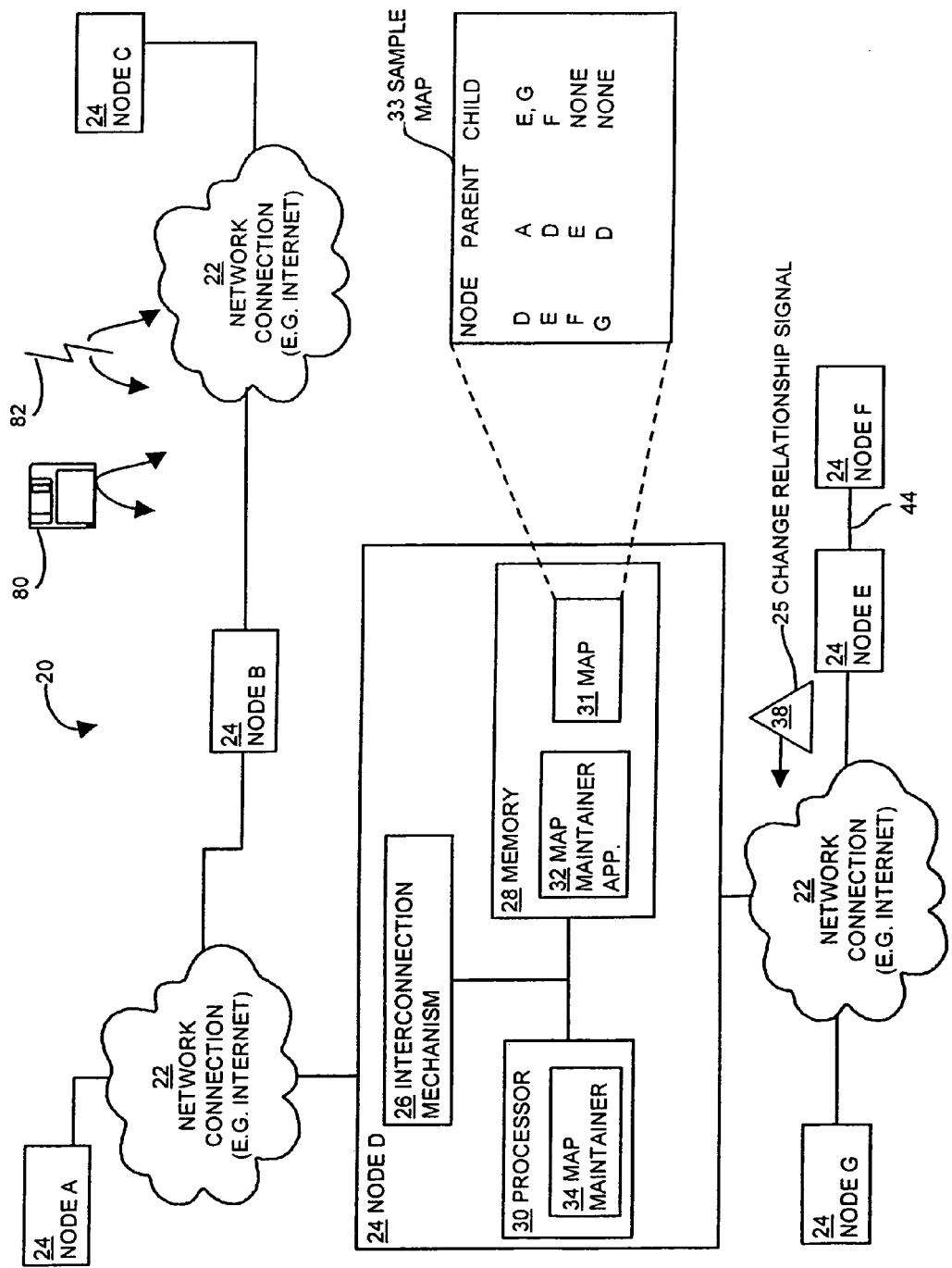
FIG. 1 illustrates an example of a network of nodes configured to operate in accordance with embodiments of the invention.

The invention is directed to techniques for maintaining a map of relationships among nodes in a network (or graph), in which the nodes are computers or network devices in a network of physical connections or logical relationships overlaying the physical connections of the network. Each node monitors or otherwise detects changes in relationships among lower level nodes (e.g., one or more child nodes in a node tree). The node may receive a signal indicating that the relationship has changed (e.g., a change relationship signal). The change may be a creation of a new relationship, such as when a child attaches itself to a new parent, or a termination of a relationship, such as when a child ends a relationship with the previous parent. A map maintainer in each node maintains a map of node relationships for nodes (e.g., nodes below the node in a node tree) and updates the map when the node receives information on a change in relationships among the nodes. If the node receives apparently contradictory change information, such as two creation signals for the same lower level node, then the map maintainer for the receiving node checks which information is most recent, usually based on a sequence number based on a count of parents that the changing node has had. In addition, the map maintainer in each node only passes on change information to higher level nodes when the change information has the most recent sequence numbers so as to avoid passing on redundant or contradictory information, such as two creation signals for the same nodes. Thus, in this approach, higher level nodes in the node tree receive only the creation and/or termination signals that are current and are not burdened with out-of-date or redundant creation or termination signals. Receiving only current information on changes in relationships is particularly important in large networks (e.g. thousands of nodes) where a large excess of change relationship signals can readily build up if the signals are not filtered, as has been described above.

A root or source node receives the change relationships as they are passed up from lower level nodes in a network (e.g., descendants of the root in a node tree). The map maintainer in the root node maintains a map of node relationships for the entire network. If a client provides a request to the root, the root can check the map to locate a valid pathway from the root node to a designated node (e.g., leaf node in a node tree) that can service the request of the client. The root redirects the client to connect to the node on the located pathway so that the node can respond to the request. The designated node now functions as a parent node to the client, which becomes a child node in the network. For example, if the root is sending data (e.g., broadcasting video data) throughout the node tree, the client receives the data from the designated node. Thus, because the root has a current map of the network, the root can direct the client to attach to a node that the map indicates has an active pathway from the child to the root. In the approach of the invention, the root is not required to invest the overhead of contacting every node in the network to update the map of the node tree every time that a client contacts the root node with a request. The root can respond more quickly to the client's request because the map maintainer in the root receives a flow of change information (e.g., change relationship signals) from nodes in the network and can thus maintain a current map of the relationships in the network.

FIG. 1 illustrates an example of a network 20 of nodes 24 configured to operate in accordance with embodiments of the invention. The network 20 includes network connections 22 that connect nodes 24 in the network. The network connections 22 are data communication links or connections suitable for connecting the computers or digital network devices. In one embodiment, the network connections 22 are TCP connections. In another embodiment, the connections 22 are IP connections that provide communication over an IP network such as the Internet. A node 24 (i.e., node A, node B, node C, node D, node E, node F, or node G) is a computer system, in one embodiment of the invention. In another embodiment, the node 24 is a network device, such as a switch, router, bridge, or other network device.

One sample node 24, node D, that is configured according to the invention includes an interconnection mechanism 26, memory 28, and processor 30. In one embodiment the other nodes 24 are configured in a manner similar to node D, 24. The interconnection mechanism 26 connects the memory 28 and the processor 30. The memory 28 includes instructions for a map maintainer application 32 and a map 31 of the node tree. The processor 30 executes the map maintainer application 32 instructions to form a map maintainer 34 that performs the functions of receiving change information and maintaining a map 31 of the network 20 as described above. In one embodiment, the map 31 is represented as a table (e.g., sample map 33). In other embodiments, the map 31 is stored as a database, list, or other suitable data structure for representing the relationships among the nodes 24.

Preferably, each node 24 in the network 20 is configured in a manner similar to node D, 24. That is, each node 24 includes an interconnection mechanism 26, memory 28, and processor 30. The memory 28 in each node 24 includes a map 31 and maintainer application 32. The processor 30 in each node 24 executes the map maintainer application 32 instructions to form the map maintainer 34 for that node 24. In alternate embodiments, the map 31 is located on a separate node 24 or database server from the other nodes 24, and the map maintainer 34 executes on a processor 30 on a separate node 24 or server from the other nodes 24.

The sample map 33 shows an example of a map 32 as maintained for node D, 24. The sample map 33 indicates that the node D, 24, has node A, 24, as a parent and that node D, 24, has two children node E, 24, and node G, 24. The sample map 33 also indicates that node E, 24, has node D, 24, as its parent and that node E, 24, has node F, 24, as its child. In addition, the sample map 33 shows that node F, 24, has node E, 24, as its parent and that node F, 24, does not have any child nodes. Sample map 33 also shows that node G, 24, has node D, 24, as its parent. The map maintainer 34 maintains the map 31 based on change information (e.g., change relationship signals 25) that it receives from lower level nodes in the network 20. The change relationship signal 25 is a signal or message indicating a change in the relationship between nodes 24, such as the relationship 44 between node E, 24, and node F, 24. (Relationships 44 will be discussed in more detail for FIG. 2.) In one embodiment, the change relationship signal is a termination signal 49 or creation signal 52, as will be discussed for FIG. 2.

The change relationship signal 25 includes a sequence number 38 that indicates how many times a node 24 has changed relationships, as will be discussed in more detail for FIG. 4. For example, when node F, 24, joined the network and created a relationship with node E, 24 (e.g., made a connection to node E, 24, on the network, or made a logical connection to node E, 24, by establishing a path over the Internet or other network), the map maintainer 34 for node D, 24, received a change relationship signal 25 indicating the new relationship. The map maintainer 34 then updates the data in the sample map 33 to its current state, so that the map 33 indicates that node F, 24, is the child of node E, 24, and that node F, 24, has no children of its own. Change relationship signals 25 are described in more detail for FIG. 2.

In one embodiment, the map 31 includes information on lower-level nodes 24. For example, as shown in FIG. 1, node D, 24, includes information on nodes E, F, and G, 24, that are below node D, 24, in a node tree. The lower level nodes E, F, and G, 24, are also termed descendants of the ancestor node, node D, 24. In other embodiments, the map 31 includes information on other nodes 24 in the network 20. For example, node D, 24, can include information on nodes B and C, 24 (not shown in FIG. 1) even though node D is not in a hierarchical relationship with nodes B and C, 24. For example, node D, 24, can have a "sibling" relationship with node B, 24, if node A, 24, is a parent to both node D, 24, and node B, 24.

As shown in FIG. 1, node D, 24, is an intermediate node 24 in the network 20. That is, node D, 24, has both a parent node, node A, 24, and a child nodes, node E, 24, and node G, 24. Any node 24 in the network 20 can function as either a parent, a child, or both. Node A, 24, serves as a root node (also termed source node) for all the nodes 24 in the network 20. In one embodiment, any node 24 serves as a root node or can take on the functionality of a root node (described in more detail for FIG. 2). For example, node B, 24, can serve as a root node for all the nodes 24 in the network 20.

In one embodiment, a computer program product 80 including a computer readable medium (e.g. one or more CDROM's, diskettes, tapes, etc.) provides software instructions (e.g., map maintainer application 32) for the map maintainer 34. The computer program product 80 can be installed by any suitable software installation procedure, as is well known in the art. In another embodiment, the software instructions can also be downloaded over a wireless connection. A computer program propagated signal product 82 embodied on a propagated signal on a propagation medium (e.g. a radio wave, an infrared wave, a laser wave, sound wave, or an electrical wave propagated over the Internet or other network) provides software instructions for the map maintainer 34. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 80 is a propagation medium that the computer can receive and read, such as by receiving the propagation medium and identifying a propagated signal embodied in the propagation medium, as described above for the computer program propagated signal product 82.

The remainder of this detailed description will present additional details for maintaining maps 31 in nodes 24 and processing of change relationships signals 25.

Figure 2:
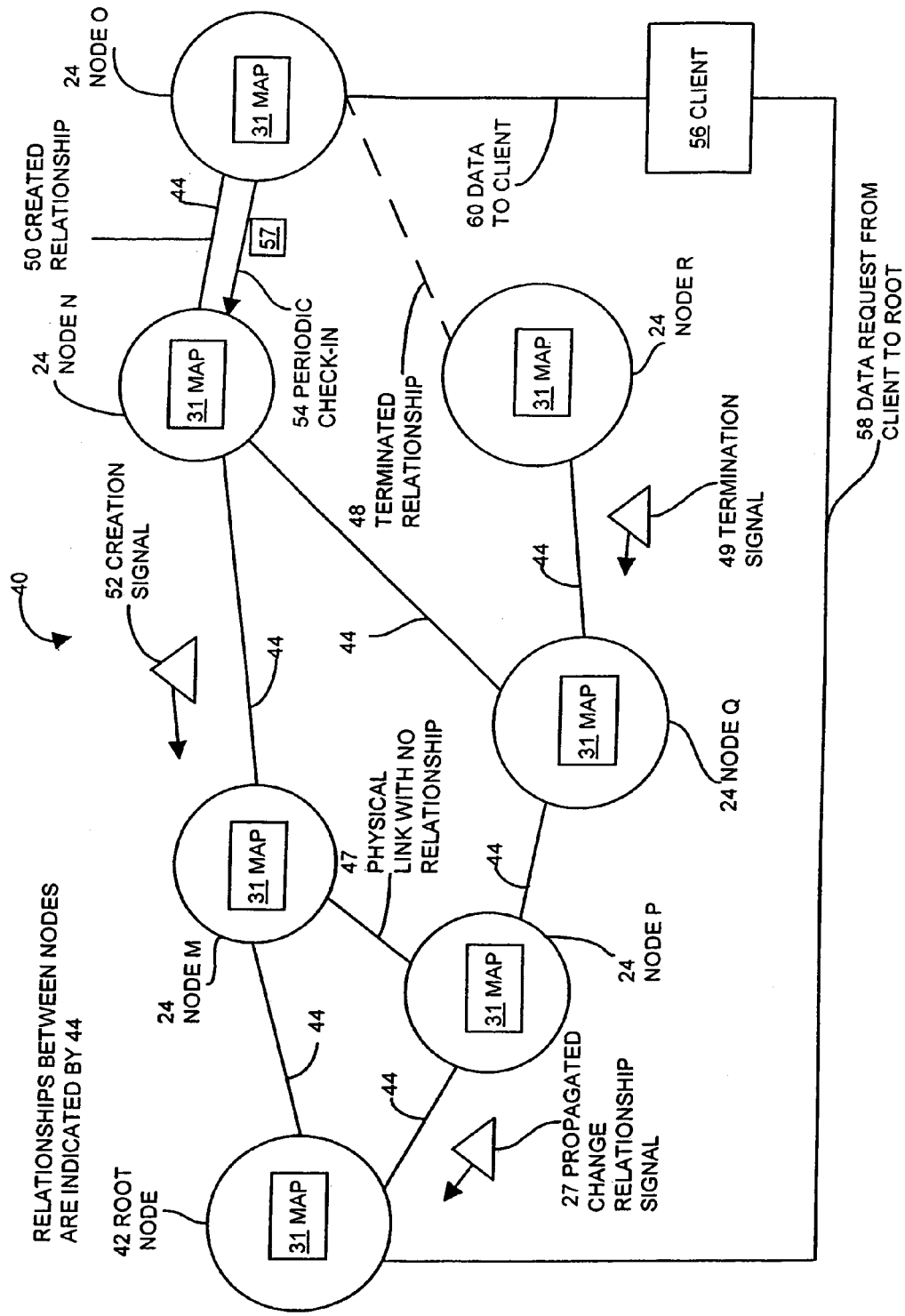
FIG. 2 illustrates an example of relationships among nodes in a network, including a creation signal and a termination signal generated by nodes configured to operate in accordance with embodiments of the invention.

FIG. 2 illustrates an example of relationships 44 among nodes 24 in a network 40, including a creation signal 52 and a termination signal 49 generated by nodes 24 configured to operate in accordance with embodiment of the invention. The nodes 24 in FIG. 2 (i.e., node M, node N, node O, node P, node Q, and node R) and root node 42 are examples of the nodes 24 illustrated in FIG. 1. The nodes 24 illustrated in FIG. 2 represent nodes 24 connected by relationships 44. In one embodiment, the relationships 44 are logical relationships, such as a hyperlink relationship across a network (e.g., HTTP hyperlink relationship across the web on the Internet). The network connections 22 in FIG. 1 illustrate one approach to establishing relationships 44. A physical connection 47, such as cables or local area networks (LAN's), can connect two nodes (e.g., node M, 24, and node P, 24) without any relationship 44 existing between the two nodes. However, a node 24 can establish a relationship 44 with another node 24 over a physical connection 47. For example, node P, 24, can establish a relationship 44 (not shown in FIG. 2) with node M, 24, over the physical connection 47 between node P, 24, and node M, 24. In another embodiment, the relationships 44 are based on physical connections 47 between nodes 24, having a one to one match between a relationship 44 and a physical connection 47.

The network 40 is shown in one example as a network 20 in FIG. 1. In one embodiment, the invention does not require the network 40 to be a network, or node tree, but can be other types of networks or graphs that are not trees. For example, the network 40 can have a relationship 44, as shown between nodes Q, 24, and node N, 24, that provides a nonhierarchical or lateral connection in the network 40. In this example, a path from the root node 42 to node O, 24, can lead through node M, 24, and node N, 24, to node O, 24, or the path can lead from the root node 42 through node P, 24, to node Q, 24, to node N, 24, to node O, 24.

The root node 42 maintains a map 31 that, in one embodiment, is a map of the entire network 40. The root node 42 is one example of the node 24 described for FIG. 1. The root node 42, in one embodiment, is a source node or server that provides data (e.g., audio or video data) that is delivered to all nodes 24 in the network 40 (i.e., broadcast to all nodes 24 based on the relationships 44 between the nodes 24). A client 56 can make a request for data 58 (e.g., video data) to the root node 42. Rather than servicing this request 58, the root node 42 directs the client 56 to make the request to one of the nodes 24 in the network 30. For example, as shown in FIG. 2, the client 56 can attach itself as a child node to node O, 24 (e.g., the client 56 establishes a relationship 44 connection over the Internet between the client 56 and node O, 24). In this example, the root node 42 broadcasts the video data to the network 40 of nodes 24. The parent node, node O, 24, of the client 56 receives the broadcast over a path of relationships 44 leading from the node, node O, 24, to the root node 42 (e.g., a path leading from the root node 42 to node M, 24, to node N, 24, to node O, 24). Node O, 24, then delivers the video data originating from the root node 42 to the client 56. In this way, the root node 42 can provide services to a very large number of clients 56 that the root node 42 could not handle directly.

In another example, each node 24 is a replica of the root node 42 that can provide the same services that the root node 42 provides. The root node 42 thus directs the client 56 to one of the nodes 24 to respond to a request 58 without burdening one node (i.e., the root node 42) with responding to all requests 58 from clients 56. For example, the root node 42 chooses a node 24 to respond to the client 56 based on proximity to the client 56 (e.g., choosing a node 24 to respond to the client 56 that is physically located on the same continent as the client 56). Alternatively, the root node 42 chooses a node 24 to respond to the client 56 based on the type of content indicated by the client's request 58. For example, in response to a request 58 for video data, the root node 42 chooses a node 24 to respond to the request 58 that has been set up to provide video data and has the video data that the client 56 is requesting.

A relationship 44 can also be a terminated relationship 48, such as the terminated relationship 48 between node O, 24, and node R, 24, or a created relationship 50, such as the created relationship 50 between node N, 24, and node O, 24. The terminated relationship 48 and the created relationship 50 are examples of change relationship signals 25. If the relationship 44 is a terminated relationship 48 between a parent node 24 and a child node 24, the parent node (e.g., node R, 24) generates a termination signal 49 indicating the end of the relationship with the child (e.g., node O, 24). The termination signal 49 is also termed a death certificate, indicating the death of the relationship 44 between two nodes 24 (e.g., end of the relationship between node O, 24, and node P, 24). If the relationship 44 is a created relationship 50 between a parent node 24 and a child node 24, the parent (e.g., node N, 24) generates a creation signal 52. The creation signal 52 is also termed a birth certificate, indicating the birth of the relationship 44 between two nodes 24 (e.g., creation of the relationship between node O, 24, and node N, 24). In another embodiment, the child node (e.g., node O, 24) that creates the relationship 50 with the parent (e.g., node N) generates the creation signal 52.

In one embodiment, a change relationship signal 25 propagates through the network (e.g., upward in a node tree from a child node 24 to a parent node 24 toward the root node 42) as a propagated change relationship signal 27 as shown in FIG. 2. In one embodiment, propagated change relationship signals 27 are either creation signals 52 or termination signals 49. For example, the propagated change relationship signal 27 originated as a termination signal 49 from node R, 24, and propagated through intermediary nodes Q, 24, and node P, 24. In this manner, propagated change relationship signals 27 propagate through the network 40 (e.g., upward in a node tree from child node 24 to parent node 24 toward the root node 42). In one embodiment, each node 24 maintains a count of how many parent nodes 24 the node 24 has had in the network 40, and a change relationship signal 25 (or propagated change relationship signal 27) generated by the node 24 includes the current count of the parents for that node 24. For example, when a node 24 in the network 40 receives propagated change relationship signals 27 from another node 24 in the network 40 (e.g., lower level node 24 in the hierarchy of a node tree), the node 24 uses the parent count to determine which propagated change relationship signal 27 is most recent (and thus valid), as will be discussed in more detail for FIG. 4.

A child node 24 performs a periodic check-in 54 (also termed a "Hello") with its parent node 24 that indicates that the relationship 44 is still valid. In another embodiment, the parent node 24 performs the periodic check-in 54 with its parent node 24. During the periodic check-in 54, the parent node 24 determines if a relationship 44 has terminated, and receives information from the child node 24, such as an indication that the child node 24 is terminating the relationship 44 or the child node 24 is providing propagated change relationship signals 27 from other nodes 24 (e.g., nodes 24 that are below the child node 24 in a node tree).

Figures 3A, 3B:
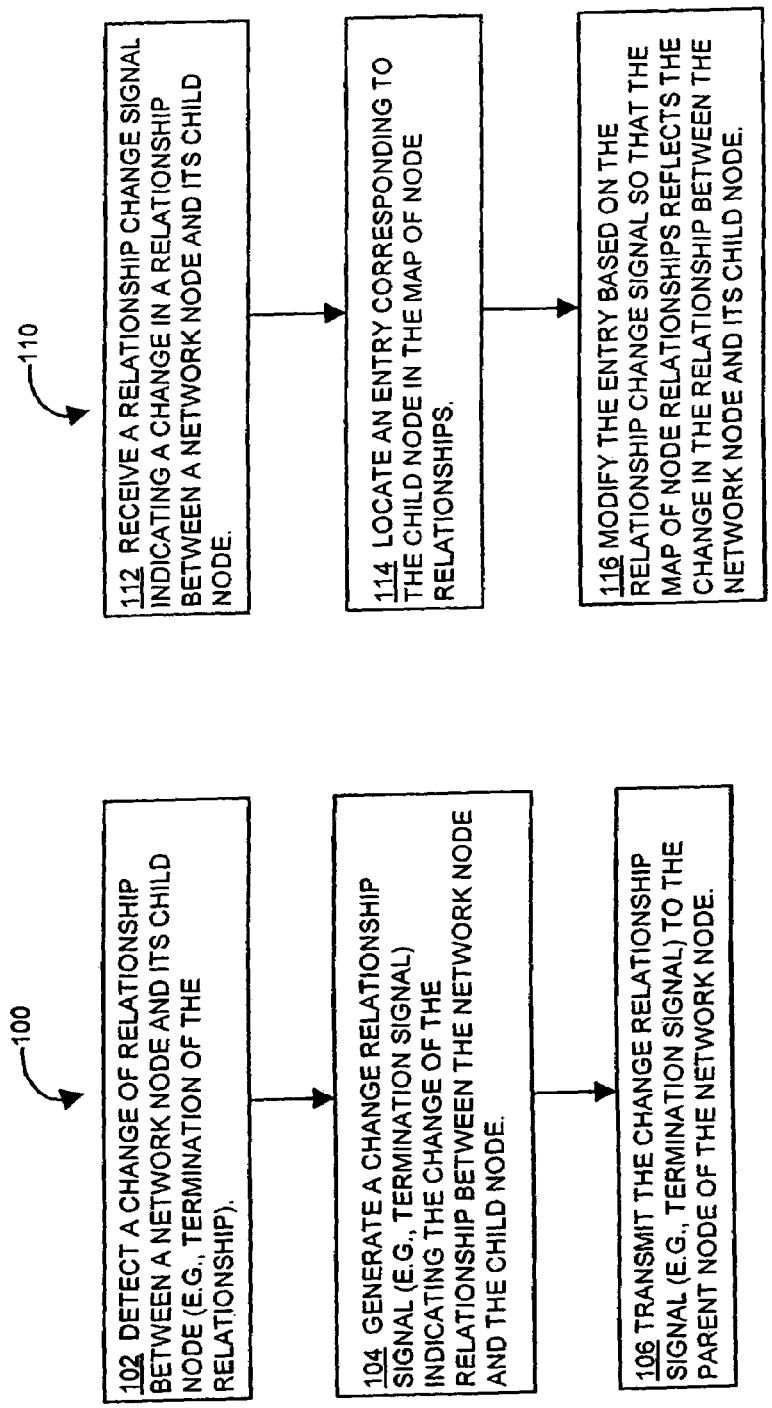
FIG. 3A shows a flow chart of a procedure for detecting and transmitting a change in a relationship between a node and a child node by a node performing in accordance with embodiments of the invention.
FIG. 3B is a flow chart of a procedure for updating a map of node relationships by a node configured to operate according to embodiments of the invention.

FIG. 3A shows a flow chart of a procedure 100 for detecting and transmitting a change in a relationship 44, by a node, 24, performing in accordance with embodiments of the invention.

In step 102, a node, 24, detects a change of relationship 44 (e.g., a termination or a creation of a relationship 44) between a node 24 and its child, 24. In one embodiment, a child node 24 scans the network 40 to determine that a pathway from the root node 42 is congested or is no longer available.

For example, the child node, node O, 24, in FIG. 2, determines that the path from node O, 24, through node R, 24, to the root node 42 is congested and any data that the root node 42 broadcasts over this path will arrive slowly at node O, 24. For example, node O, 24, determines that the time for packets traveling between the root node 42 to node O, 24, has increased beyond a preset limit that indicates that the packets are traveling on a congested path. Node O, 24, then chooses to attach itself to a new parent, node N, 24, so that the pathway from the root node 42 passes through node N, 24, rather than node R, 24. As another example, node O, 24, determines that node P, 24, and node Q, 24, are no longer available or no longer functional, which means that a path between node O, 24, and the root node 42 through node P, 24, and node Q, 24, is no longer available. Node O, 24, then terminates the relationship 44 with its parent, node R, 24, as indicated by the terminated relationship 48, as shown in FIG. 2. Node R, 24, detects the change in relationship 44 with its child, node O, 24, that is, the termination of the relationship 44. For example, the child node, 24, fails to check in periodically with the parent, which indicates the termination of the relationship 44 to the parent node 24.

In step 104, the parent node 24 generates a change relationship signal 25 indicating the change of relationship between the node 24 and its child 24. For example, node R, 24, generates a termination signal 49 after detecting that the end of a relationship with node O, 24, as described for step 102. In one embodiment, the termination signal 49 includes a count of the parents that the child node, 24, has had. For example, if node O, 24, had five parents before attaching to node R, 24, then the parent count has a value of 6 after node O, 24, attached as a child to node R, 24. Then, in the example shown in FIG. 2, node R, 24, generates a termination signal 49 with a parent count of 6, indicating that node R, 24, was the sixth parent of node O, 24.

In step 106, the parent node 24 transmits the change relationship signal 25 to the next node 24 in the network 40. The next node 24 in the network 40 is the root node 42 or an intermediary node 24 between the parent node 24 and the root node 42. In one embodiment, the intermediary node 24 is a higher level in a hierarchy between the parent node 24 and the root node 24. For example, node R, 24, transmits the termination signal 49 to node Q, 24, which is an intermediary node 24 between node R, 24, and the root node 42.

FIG. 3B is a flow chart of a procedure 110 for updating a map 31 of node relationships 44 by a node 24 configured to operate according to embodiments of the invention. In one embodiment, the node 24 referred to in procedure 110 is a node 24 in a network 40, such as node Q, 24, shown in FIG. 2. In another embodiment, the node 24 referred to in procedure 110 is a root node 42.

In step 112, the node 24 receives a change relationship signal 25 indicating a change in relationship 44 between a node 24 and its child node 24. For example, node N, 24, as shown in FIG. 2, receives a creation signal 52 from node O, 24, when node O, 24, attaches itself as a child to node N, 24.

In step 114, the node 24 that received the change relationship signal 25 locates an entry corresponding to the child node 24 in the map 31 of node relationships 44. In one embodiment, the node 24 locates the entry in the map 31 located in node N, 24. For example, node N, 24, locates an entry in the map 31 for node O, 24.

In step 116, the node 24 that received the change relationship signal 25 modifies the entry in the map 31 based on the change relationship signal 25 so that the map 31 of node relationships 44 reflects the change in the relationship 44 between the node 24 and its child node 24. For example, node N, 24, updates the entry that was located in step 114 and updates the entry to indicate that node O, 24, is no longer a child of node N, 24.

In another embodiment, the node 24 that received the change relationship signal 25 locates an entry in the map 31 corresponding to the parent node, 24, and updates the entry for the parent node, 24, to indicate that the child node 24 is no longer a child of that parent node 24.

Figure 4:
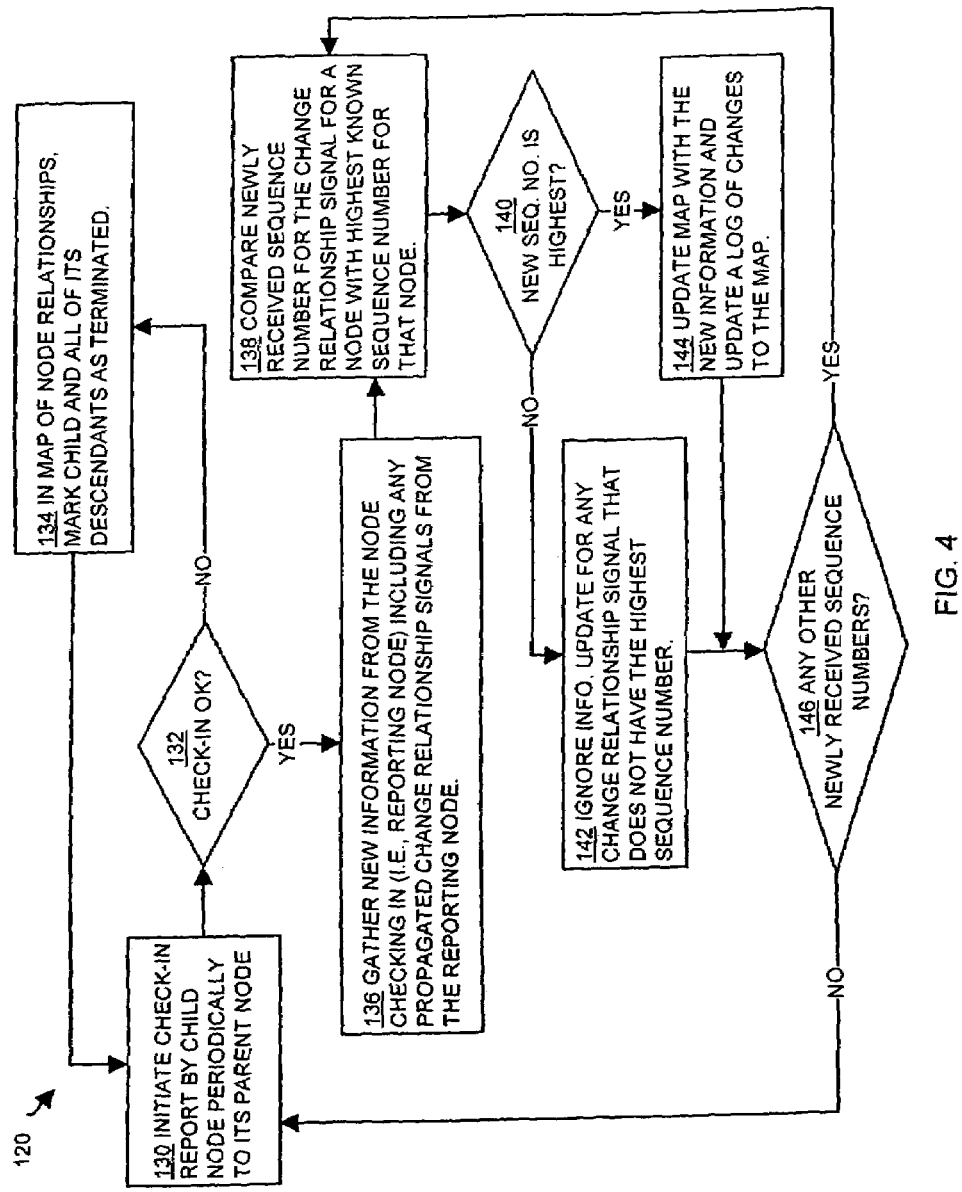
FIG. 4 is a flow chart of a procedure for checking the status of a child node and processing any changes in relationships by a node configured to perform according to embodiments of the invention.

FIG. 4 is a flow chart of a procedure 120 for checking the status of child nodes 24 and processing any changes in relationships 44 by a node 24 configured to perform according to embodiments of the invention. In this discussion of procedure 120, the node 24 that receives the status of its child nodes 24 is any node 24 having child nodes 24 and is referred to as a receiving node 24 in the following discussion for FIG. 4, because the receiving node 24 receives a check-in report 57 from its child nodes 24 as described in step 136. In another embodiment, the receiving node 24 is a root node 42.

In step 130, the parent node 24 receives the status of each of its child nodes 24 with a periodic check-in 54 initiated by its child nodes 24 until the parent node 24 has received a check-in report 57 from all of its child nodes 24 (if no relationships 44 have terminated). Because the child node 24 checks in with the parent node 24, the child node 24 can be located behind a firewall (e.g., the node 24 is a computer server within a corporate network) that the parent node 24 cannot send signals through. For example, as shown in FIG. 2, the child node O, 24, performs a periodic check-in 54 with its parent node N, 24. In one embodiment, each child node 24 performs its periodic check-in 54 at a preset time interval (e.g., every 10 minutes). The freshness of the data in the map 31 of node relationships 44 depends on the size of the time interval which can be tuned (e.g., increased or decreased). If the interval is short, then the map 31 of the parent node 24 is more up to date, and changes in the relationships 44 propagate more rapidly through the network 20 to the root note 22.

In another embodiment, each parent node 24 performs a periodic check-in 54 of each of its child nodes 24. After the parent node 24 checks all of the child nodes 24, then, in one embodiment, the parent node 24 waits a predefined interval of time (e.g., 1 minutes) and begins the check-in procedure 120 of all of its children again starting with step 130.

In step 132, the parent node 24 determines if it has received a period check-in 54 from a child node 24. If the child node 24 has not able to check in with the parent node 24 after a certain time interval (e.g. 15 minutes), then, in step 134, the parent node 24 marks the child node 24 and all of its descendant nodes 24 as terminated in the map 31 of relationships 44 that the parent node 24 maintains at the parent node 24. The parent node 24 assumes that the child node 24 has failed, an intervening link has failed, or the child node 24 has changed to a new parent node 24.

In step 136, if the check-in is OK, the parent node 24 (herein now referred to as the receiving node) gathers new information (i.e., check-in report 57) from the child node 24 (herein referred to now as the reporting node 24) including any propagated change relationship signals 27 that the reporting node 24 has received from other nodes 24 (e.g., from children of the reporting node 24 in a node tree). The check-in report 57 from the child node 24 includes several different pieces of information, as will be described in the following paragraphs.

The check-in report 57 includes information on any direct child nodes 24 of the reporting node 24 for which the reporting node 24 has received check-in reports. In another embodiment, the reporting node 24 expects its child nodes 24 to check in with the reporting node and the check-in report 57 includes any child nodes 24 that have missed their expected report time. In one embodiment, the reporting node 24 includes a termination signal 49 for each of its child nodes 24 for which the reporting node 24 has not received the check-in report 57.

The check-in report 57 also includes information on any new nodes 24 that have become child nodes 24 of the reporting node 24 including the existing children 24 of the new node 24. In one embodiment, the reporting node 24 includes a creation signal 52 for each of the new child nodes 24.

The check-in report 57 further includes any changes to additional data (also termed "extra information") for the reporting node 24. The additional information is any suitable additional data about the reporting node 24 or associated with the reporting node 24. For example, the additional data may include information about clients 56 that have received data from the reporting node 24, the type of data, the number of log-ins for each client 56 to the reporting node 24, the number of clients 56 that have logged in to the reporting node 24 in a given time period (e.g., 24 hours) and other data related to clients 56 of the reporting node 56. In another example, the additional data includes information identifying a coverage zone for the reporting node 24, such as a group of clients 56 that the reporting node 24 is expected to cover or service (e.g., clients 56 in a geographical area or clients 56 having IP addresses within a defined range of addresses).

The check-in report 57 also includes any of the above described changes (e.g., termination signals 49, creation signals 52, and additional data) that have occurred in nodes 24 below the reporting node 24 (e.g., nodes 24 below the reporting node 24 in a hierarchical tree of nodes 24) and that have been recently reported to the reporting node 24.

In step 138, the receiving node 24 compares any newly received sequence numbers 38 (e.g., parent counts, as described previously) included in propagated change relationship signals 27 for a specific node 24 with the highest known sequence number 38 for that specific node 24. For example, the receiving node 24 knows that the parent count for a specific node 24 has a value of 18 (e.g., based on previously received propagated change relationship signals 27 for that specific node 24). The check-in report 57 includes a creation signal 52 for the specific node 24 with a parent count of 17. In step 140, the receiving node 24 compares the parent count in the newly received creation signal 52 with the known parent count for the specific node 24 to determine which parent count is the highest.

If the newly received sequence number 38 is not the highest, then, in step 142, the receiving node 24 ignores the propagated change relationship signal 27 for the specific node 24. For example, if the creation signal 52 has a parent count of 17, which is lower than the highest known parent count of 18 for the specific node 24, then the receiving node ignores the creation signal 52 and does not update its map 31.

If the newly received sequence number 38 is highest, then, in step 144, the receiving node 24 updates its map 31 with the new information and updates a log of changes made to the map 31. For example, if the newly received sequence number 38 is in a creation signal 52 indicating that the specific node 24 has attached to a node 24, then the receiving node 24 updates its entry in the map 31 for the specific node 24 with the information on the parent for the specific node 24. The receiving node 24 also updates the entry for the new parent node 24 to indicate that the parent node 24 has the specific node 24 as a new child node 24.

In step 146, if there are any other newly received sequence numbers 38 (e.g., in propagated change relationship signals 27) in the check-in report 57, then the receiving node 24 returns to step 138. If there are no other newly received sequence numbers 38 in the check-in report 57, then the receiving node 24 proceeds to step 130 to check the status of any unchecked child nodes 24.

Figure 5:
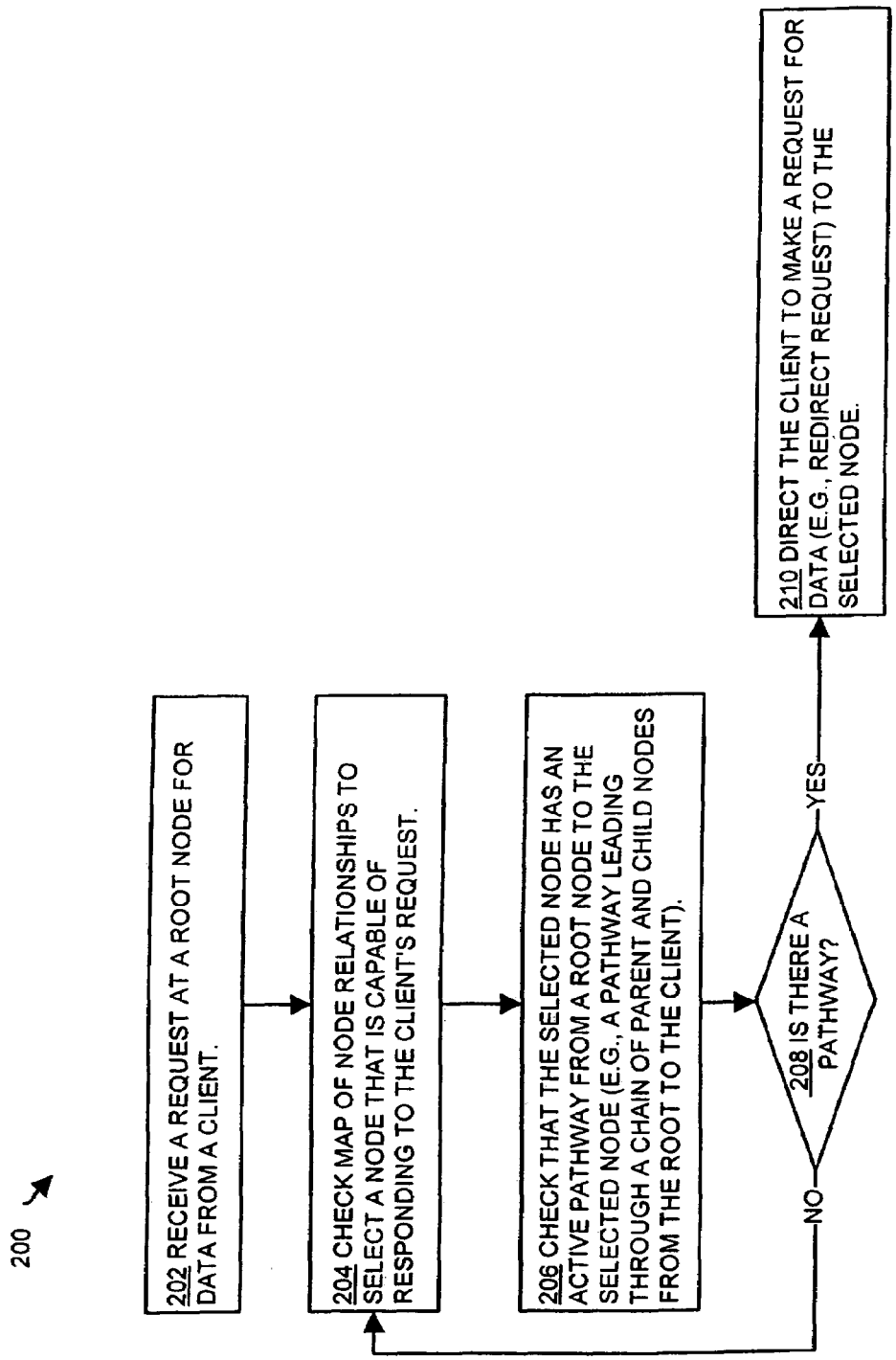
FIG. 5 is a flow chart of a procedure for using a map of node relationships to direct a request from a client to a node selected to respond to the request by another node configured operating in accordance with embodiments of the invention.

FIG. 5 is a flow chart of a procedure 200 for using a map 31 of node relationships 44 to direct a request 58 from a client 56 to a node 24 selected to respond to the request 58 by a node 24 configured to operate in accordance with embodiments of the invention. In one embodiment, the root node 42 receives the request 58, as described below for FIG. 5. In another embodiment, the node receiving the request 58 can be any node 24 (e.g. any node 24 in the network 40 shown in FIG. 2).

In step 202 of procedure 200, a root node 42 receives a request 58 for data from a client 56. For example, the root node 42 receives a request 58 for video or audio data.

In step 204, the root node 42 checks the map 31 of node relationships 44 to select a node 24 that is capable of responding to the request 58 from the client 56. For example, the root node 42 selects a node 24 that is geographically close to the client 56.

In step 206, the root node 42 checks that the selected node 24 has an active pathway from a root node 42 to the selected node 24. For example, the pathway leads through a chain of parent nodes 24 and child nodes 24 (with intermediate nodes 24 performing the role of both parent and child) from the root node 42 to the client 56.

In step 208, the root node 42 determines if the pathway is active. If the pathway is not active, then the root node 42 returns to step 204 to check the map 31 to select another node 24 to handle the request 58. If the pathway is active, then, in step 210, the root node 42 directs the client 56 to make the request 58 for data (e.g. a redirect request) to the node 24 selected in step 204.

Figure 6:
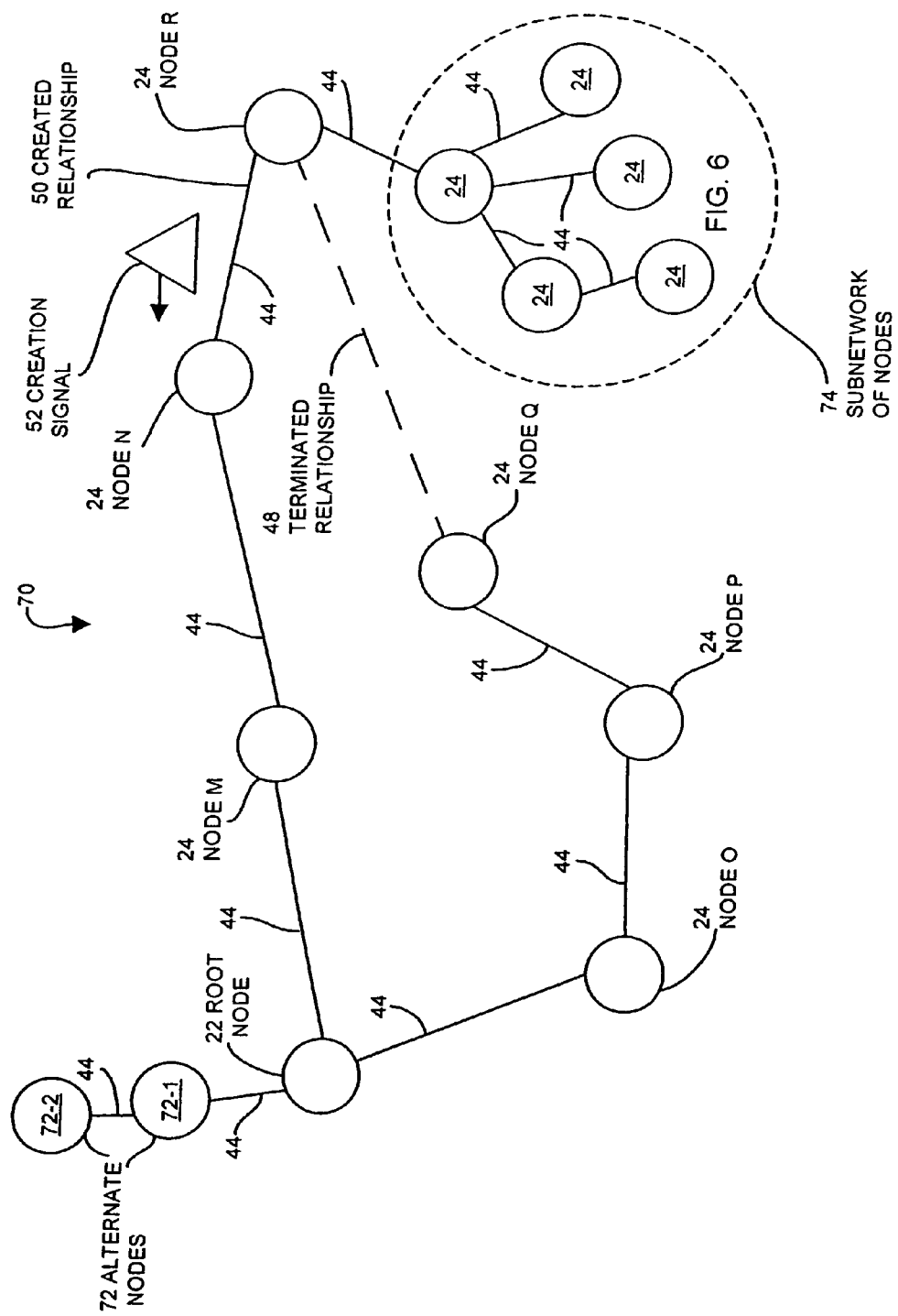
FIG. 6 is a diagram of node relationships illustrating alternate nodes and a subnetwork of nodes for a network of nodes configured to operate in accord with embodiments of the invention.

FIG. 6 is a diagram of node relationships 44 illustrating alternate nodes 72-1 and 72-2 (generally referred as alternate nodes 72) and a subnetwork of nodes 74 for a network of nodes 70 configured to operate in accord with embodiments of the invention.

The alternate nodes 72 are one type of node 24. The root node 42 passes on to the alternate node 72-1 all of the change relationship signals 25 and propagated change relationship signals 27 that the root node 42 receives. The alternate node 72-1 in turn passes on all of these signals 25, 27 to alternate node 72-2. In other embodiments, alternate node 72-2 passes on the signals 25, 27 passed on from the root node 72 to additional alternate nodes 72. In one embodiment, the additional alternate nodes 72 have relationships 44 in a linear manner similar to what is shown for alternate nodes 72-1, 72-2 and the root node 42. In another embodiment, the root node 42 attaches to alternate nodes 72 in a nonlinear manner (e.g., a star shaped graph or other nonlinear graph). If the root node 42 becomes unavailable or fails, then any of the alternate nodes 72 can substitute for the root node 42 and take on the functions of the root node 42 (i.e., the alternate node 72 serves as the root for the network 70). For example, if the root node 42 fails, then the alternate node 72-1 takes on the functions of the root node 42. If alternate node 72-1 then fails and the root node 42 has not yet recovered from its failure, then the alternate node 72-2 takes on the functions of the root node 42. In this approach of substituting alternate node 72 for a root node 42, the failure of the root node 42 is not noticed by any other nodes 24 in the network 70, or by any clients 56 who may be receiving services from nodes 24 in the network 70. For example, suppose that a client 56 is receiving through a node 24 in the network 70 an audio stream of data that the root node 42 is broadcasting throughout the network 70. If the root node 42 fails, then the client 56 can continue to receive the audio stream of data without interruption, because the alternate node 72-1 steps in to provide the audio stream of data to the nodes 24 in the network 70 as soon as the root node 42 fails.

A subnetwork of nodes 74 attached to a node 24, such as node R, 24, as shown in FIG. 6, can become attached to different nodes 24 in the network 70. For example, a subnetwork of nodes 74 may be associated with node Q, 24, (e.g., the nodes 24 in the subnetwork 74 are descendants of node Q, 24) because node R, 24, had a relationship 44 with node Q, 24 (shown as terminated relationship 48 in FIG. 6). If node R, 24, terminates its relationship 48 with node Q, 24, and has a newly created relationship 50 with node N, 24, then the subnetwork of nodes 74 is associated with node N, 24, (e.g., the nodes 24 in the subnetwork 74 are now descendants of node N, 24) because node R, 24, is now a child of node N, 24. In this example, node R, 24, generates a creation signal 52 that includes data on the newly created relationship 50 between node R, 24, and node N, 24.

In one embodiment, the creation signal 52 shown in FIG. 6 includes information on all nodes 24 associated with node R, 24 (e.g., all nodes 24 below node R, 24, in a hierarchy of nodes 24). This information may be useful at another point in the network 70. For example, the information on the nodes 24 in the subnetwork 74 can be combined into a single description (i.e., a group membership count) that can be propagated to the root node 22. In another example, node Q, 24, generates a large number of termination signals 49 that reflect the movement of the nodes 24 in the subnetwork 74, and node R, 24, generates a creation signal 52 that indicates that the nodes 24 in the subnetwork 74 are still attached to the network 70 through node R, 24. A joint ancestor of both nodes R, 24, and node Q, 24, (e.g., the root node 42 in network 70) can determine that the large number of termination signals 49 for the nodes 24 in the subnetwork 74 are not valid and thus ignore them.

In another embodiment, the creation signal 52 does not include any information on the lower level nodes 24 in the subnetwork of nodes 74, as long as there are no changes in the relationships 44 of the nodes 24 in the subnetwork 74. A node 24, such as node N, 24, receiving the creation signal 52 updates its map 31 of nodes 24 based on the assumption that the nodes 24 in the subnetwork of nodes 24 are still associated with node R, 24, and that the relationships 44 between the nodes 24 in the subnetwork 24 have not changed. In this way, the creation signal 52 shown in FIG. 6 is not required to include all the information about all the nodes 24 in the subnetwork of nodes 24 and their relationships 44. Thus, when the root node 42 receives the creation signal 52 it only receives the information on the change of relationships 44 for node R, 24, and can infer that the relationships 44 within the subnetwork of nodes 74 has not changed.

While this invention has been particularly shown and described with references to preferred embodiments thereof, it will be understood by those skilled in the art that various changes in form and details may be made therein without departing from the spirit and scope of the invention as defined by the claims below.

For example, the invention is suitable for use with a network 70 of nodes 24 that are connected by any suitable underlying physical connections, such as a local area network (LAN), modem connections, channel connections, or other connections.

In addition, a node 24 can be any communicating entity, such as a computer or other electronic device, software module, or humans. The change relationship signals 25 and propagated change relationship signals 27 can be any type of message exchanged in any medium. For example, the signals 25, 27 can be data packets, HTTP requests, function calls, or hand written notes.

Furthermore, a node 24 (e.g., root node 42) can maintain information (e.g., other than relationship information) about other nodes 24 in the network 40. For example, a node 24 can maintain information about whether other nodes 24 in the network 40 are active (i.e., alive) or inactive (i.e., dead) without maintaining information about parent/child relationships 44 between nodes 24. Such an approach can be useful if the topology of the network 40 (e.g., relationships 44 among nodes 24) is known and unlikely to change. In this approach, the change of relationship signal 25 can include status information (e.g., whether a node 24 is active or inactive) and may not include other types of relationship information (e.g., parent/child information). Alternatively, a different signal (e.g., change of status signal) provides the information on the status of a node 24 and is forwarded to higher level nodes 24 in the network 40 in a manner similar to the propagation of a change relationship signal (e.g., propagated change relationship signal 27).

In addition, the sequence number 38 can be any type of monotonically increasing number (i.e., not necessarily a parent count 17). For example, the sequence number 38 can be based on an amount of time that has passed since some initial date, such as the number of seconds that have elapsed since 1970.

The section below is captioned "Overcast: Reliable Multicasting with an Overlay Network" and provides an example of a system that uses one approach of the invention and is meant to be considered as part of the detailed disclosure of embodiments of the invention. The system described below, however, is to be considered as an example only, and it is to be understood that this example is not meant to be limiting of the invention.

OVERCAST: RELIABLE MULTICASTING WITH AN OVERLAY NETWORK

Overcast is an application-level multicasting system that can be incrementally deployed using today's Internet infrastructure. These properties stem from Overcast's implementation as an overlay network. An overlay network consists of a collection of nodes placed at strategic locations in an existing network fabric. These nodes implement a network abstraction on top of the network provided by the underlying substrate network.

Overcast provides scalable and reliable single-source multicast using a simple protocol for building efficient data distribution trees that adapt to changing network conditions. To support fast joins, Overcast implements a new protocol for efficiently tracking the global status of a changing distribution tree.

Results based on simulations confirm that Overcast provides its added functionality while performing competitively with IP Multicast. Simulations indicate that Overcast quickly builds bandwidth-efficient distribution trees that, compared to IP Multicast, provide 70%–100% of the total bandwidth possible, at a cost of somewhat less than twice the network load. In addition, Overcast adapts quickly to changes caused by the addition of new nodes or the failure of existing nodes without causing undue load on the multicast source.

1 INTRODUCTION

Overcast is motivated by real-world problems faced by content providers using the Internet today. How can bandwidth-intensive content be offered on demand? How can long-running content be offered to vast numbers of clients? Neither of these challenges are met by today's infrastructure, though for different reasons. Bandwidth- intensive content (such as 2Mbit's video) is impractical because the bottleneck bandwidth between content providers and consumers is considerably less than the natural consumption rate of such media. With currently available bandwidth, a 10-minute news clip might require an hour of download time. On the other hand, large-scale (thousands of simultaneous viewers) use of even moderate-bandwidth live video streams (perhaps 128Kbit's) is precluded because network costs scale linearly with the number of consumers.

Overcast attempts to address these difficulties by combining techniques from a number of other systems. Like IP Multicast, Overcast allows data to be sent once to many destinations. Data are replicated at appropriate points in the network to minimize bandwidth requirements while reaching multiple destinations. Overcast also draws from work in caching and server replication. Overcast's multicast capabilities are used to fill caches and create server replicas throughout a network. Finally Overcast is designed as an overlay network, which allows Overcast to be incrementally deployed. As nodes are added to an Overcast system the system's benefits are increased, but Overcast need not be deployed universally to be effective.

An Overcast system is an overlay network consisting of a central source (which may be replicated for fault tolerance), any number of internal Overcast nodes (standard PCs with permanent storage) sprinkled throughout a network fabric, and standard HTTP clients located in the network. Using a simple tree-building protocol, Overcast organizes the internal nodes into a distribution tree rooted at the source. The tree-building protocol adapts to changes in the conditions of the underlying network fabric. Using this distribution tree, Overcast provides large-scale, reliable multicast groups, especially suited for on-demand and live data delivery. Overcast allows unmodified HTTP clients to join these multicast groups.

Overcast permits the archival of content sent to multicast groups. Clients may specify a starting point when joining an archived group, such as the beginning of the content. This feature allows a client to "catch up" on live content by tuning back ten minutes into a stream, for instance. In practice, the nature of a multicast group will most often determine the way it is accessed. A group containing stock quotes will likely be accessed live. A group containing a software package will likely be accessed from start to finish; "live" would have no meaning for such a group. Similarly, high-bandwidth content can not be distributed live when the bottleneck bandwidth from client to server is too small. Such content will always be accessed relative to its start.

We have implemented Overcast and used it to create a data distribution system for businesses. Most current users distribute high quality video that clients access on demand. These businesses operate geographically distributed offices and need to distribute video to their employees. Before using Overcast, they met this need with low resolution web accessible video or by physically reproducing and mailing VHS tapes. Overcast allows these users to distribute high-resolution video over the Internet. Because high quality videos are large (Approximately 1 Gbyte for a 30 minute MPEG-2 video), it is important that the videos are efficiently distributed and available from a node with high bandwidth to the client. To a lesser extent, Overcast is also being used to broadcast live streams. Existing Overcast networks typically contain tens of nodes and are scheduled to grow to hundreds of nodes.

The main challenge in Overcast is the design and implementation of protocols that can build efficient, adaptive distribution trees without knowing the details of the substrate network topology. The substrate network's abstraction provides the appearance of direct connectivity between all Overcast nodes. Our goal is to build distribution trees that maximize each node's bandwidth from the source and utilize the substrate network topology efficiently. For example, the Overcast protocols should attempt to avoid sending data multiple times over the same physical link. Furthermore, Overcast should respond to transient failures or congestion in the substrate network.

Figure 7:
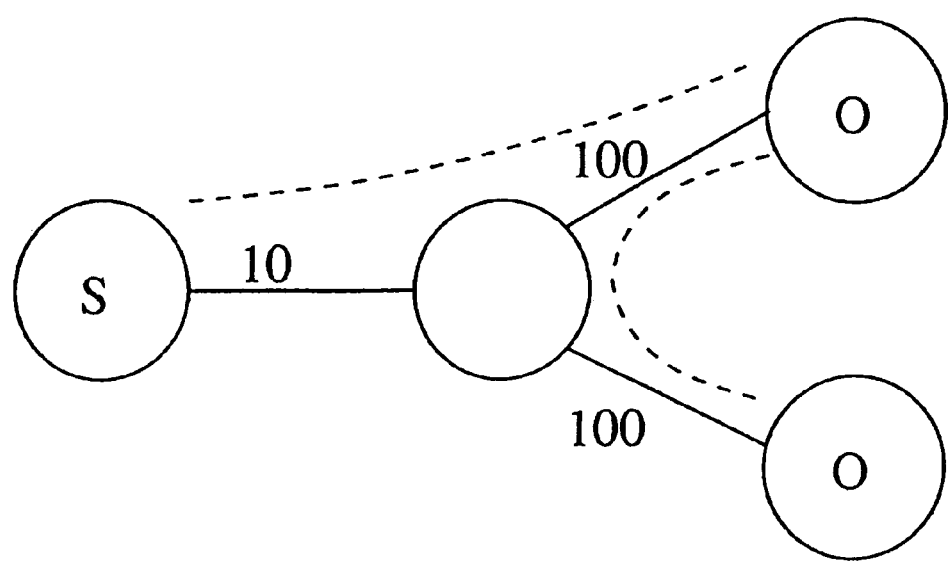
FIG. 7 is a diagram of an example network and Overcast topology.

Consider the simple network depicted in FIG. 7, which is an example network and Overcast topology. The straight lines are the links in the substrate network. These links are labeled with bandwidth in Mbit's. The curved lines represent connections in the Overlay network. S represents the source, O represents two Overcast nodes.

The network substrate consists of a root node (R), two Overcast nodes (O), a router, and a number of links. The links are labeled with bandwidth in Mbit's. There are three ways of organizing the root and the Overcast nodes into a distribution tree. The organization shown optimizes bandwidth by using the constrained link only once.

The contributions of this paper are:

A novel use of overlay networks. We describe how reliable, highly-scalable, application-level multicast can be provided by adding nodes that have permanent storage to the existing network fabric.

A simple protocol for forming efficient and scalable distribution trees that adapt to changes in the conditions of the substrate network without requiring router support.

A novel protocol for maintaining global status at the root of a changing distribution tree. This state allows clients to join an Overcast group quickly while maintaining scalability.

Results from simulations that show Overcast is efficient. Overcast can scale to a large number of nodes; its efficiency approaches router-based systems; it quickly adjusts to configuration changes; and a root can track the status of an Overcast network in a scalable manner. Section 2 below details Overcast's relation to prior work. Overcast's general structure is examined in Section 3, first by describing overlay networks in general, then providing the details of Overcast. Section 4 describes the operation of the Overcast network performing reliable application-level multicast. Finally, Section 5 examines Overcast's ability to build a bandwidth-efficient overlay network for multicasting and to adapt efficiently to changing network conditions.

2 RELATED WORK

Overcast seeks to marry the bandwidth savings of an IP Multicast distribution tree with the reliability and simplicity of store-and-forward operation using reliable communication between nodes. Overcast builds on research in IP multicast, content distribution (caching, replication, and content routing), and overlay networks. We discuss each in turn.

IP Multicast IP Multicast is designed to provide efficient group communication as a low level network primitive. Overcast has a number of advantages over IP Multicast. First, as it requires no router support, it can be deployed incrementally on existing networks. Second, Overcast provides bandwidth savings both when multiple clients view content simultaneously and when multiple clients view content at different times. Third, while reliable multicast is the subject of much research, problems remain when various links in the distribution tree have widely different bandwidths. A common strategy in such situations is to decrease the fidelity of content over lower bandwidth links. Although such a strategy has merit when content must be delivered live, Overcast also supports content types that require bit-for-bit integrity, such as software.

Content Distribution Systems Others have advocated distributing content servers in the network fabric, from initial proposals to larger projects, such as Adaptive Caching, Push Caching, Harvest, Dynamic Hierarchical Caching, Speculative Data Dissemination, and Application-Level Replication. Overcast extends this previous work by building an overlay network using a self-organizing algorithm. This algorithm, operating continuously, not only eliminates the need for manually determined topology information when the overlay network is created, but also reacts transparently to the addition or removal of nodes in the running system. Initialization, expansion, and fault tolerance are unified.

A number of service providers (e.g., Adero, Aka-mai, and Digital Island) operate content distribution networks, but in-depth information describing their internals is not public information. FastForward's product is described below as an example of an overlay network.

Overlay Networks A number of research groups and service providers are investigating services based on overlay networks. In particular, many of these services, like Overcast, exist to provide some form of multicast or content distribution. These include End System Multicast, Yoid (formerly Yalicast), X-bone, RMX, FastForward, and PRISM. All share the goal of providing the benefits of IP multicast without requiring direct router support or the presence of a physical broadcast medium. However, except Yoid, these approaches do not exploit the presence of permanent storage in the network fabric.

End System Multicast is an overlay network that provides small-scale multicast groups for teleconferencing applications; as a result the End System Multicast protocol (Narada) is designed for multisource multicast. The Overcast protocols different from Narada in order to support large-scale multicast groups.

X-bone is also a general-purpose overlay network that can support many different network services. The overlay networks formed by X-bone are meshes, which are statically configured.

RMX focuses on real-time reliable multicast. As such, its focus is on reconciling the heterogeneous capabilities and network connections of various clients with the need for reliability. Therefore their work focuses on semantic rather than data reliability. For instance, RMX can be used to change high resolution images into progressive JPEGs before transmittal to underprovisioned clients. Our work is less concerned with interactive response times. Overcast is designed for content that clients are interested in only at full delity, even if it means that the content does not become available to all clients at the same time.

FastForward Networks produces a system sharing many properties with RMX. Like RMX, FastForward focuses on real-time operation and includes provisions for intelligently decreasing the bandwidth requirements of rich media for low-bandwidth clients. Beyond this, FastForward's product differs from Overcast in that its distribution topology is statically configured by design. Within this statically configured topology, the product can pick dynamic routes. In this way FastForward allows experts to configure the topology for better performance and predictability while allowing for a limited degree of dynamism. Overcast's design seeks to minimize human intervention to allow its overlay networks to scale to thousands of nodes. Similarly, FastForward achieves fault tolerance by statically configuring distribution topologies to avoid single points of failure, while Overcast seeks to dynamically reconfigure its overlay in response to failures.

Active Networks One may view overlay networks as an alternative implementation of active networks. In active networks, new protocols and application-code can dynamically be downloaded into routers, allowing for rapid innovation of network services. Overcast avoids some of the hard problems of active networks by focusing on a single application; it does not have to address the problems created by dynamic downloading of code and sharing resources among multiple competing applications. Furthermore, since Overcast requires no changes to existing routers, it is easier to deploy. The main challenge for Overcast is to be competitive with solutions that are directly implemented on the network level.

3 THE OVERCAST NETWORK

This section describes the overlay network created by the Overcast system. First, we argue the benefits and drawbacks of using an overlay network. After concluding that an overlay network is appropriate for the task at hand, we explore the particular design of an overlay network to meet Overcast's demands. To do so, we examine the key design requirement of the Overcast network--single source distribution of bandwidth-intensive media on today's Internet infrastructure. Finally we illustrate the use of Overcast with an example.

3.1 WHY OVERLAY?

Overcast was designed to meet the needs of content providers on the Internet. This goal led us to an overlay network design. To understand why we chose an overlay network, we consider the benefits and drawbacks of overlays. An overlay network provides advantages over both centrally located solutions and systems that advocate running code in every router. An overlay network is:

Incrementally Deployable An overlay network requires no changes to the existing Internet infrastructure, only additional servers. As nodes are added to an overlay network, it becomes possible to control the paths of data in the substrate network with ever greater precision.

Adaptable Although an overlay network abstraction constrains packets to over a constrained set of links, that set of links is constantly being optimized over metrics that matter to the application. For instance, the overlay nodes may optimize latency at the expense of bandwidth. The Detour Project has discovered that there are often routes between two nodes with less latency than the routes offered by today's IP infrastructure. Overlay networks can find and take advantage of such routes.

Robust By virtue of the increased control and the adaptable nature of overlay networks, an overlay network can be more robust than the substrate fabric. For instance, with a sufficient number of nodes deployed, an overlay network may be able to guarantee that it is able to route between any two nodes in two independent ways. While a robust substrate network can be expected to repair faults eventually, such an overlay network might be able to route around faults immediately.

Customizable Overlay nodes may be multipurpose computers, easily outfitted with whatever equipment makes sense. For example, Overcast makes extensive use of disk space. This allows Overcast to provide bandwidth savings even when content is not consumed simultaneously in different parts of the network. Standard An overlay network can be built on the least common denominator network services of the substrate network. This ensures that overlay traffic will be treated as well as any other. For example, Overcast uses TCP (in particular, I-ITTP over port 80) for reliable transport. TCP is simple, well understood, network friendly, and standard. Alternatives, such as a "home grown" UDP protocol with retransmissions, are less attractive by all these measures. For better or for worse, creativity in reliable transport is a losing battle on the Internet today. On the other hand, building an overlay network faces a number of interesting challenges. An overlay network must address:

Management complexity The manager of an overlay network is physically far removed from the machines being managed. Routine maintenance must either be unnecessary or possible from afar, using tools that do not scale in complexity with the size of the personnel.

The real world In the real world, IP does not provide universal connectivity. A large portion of the Internet lies behind firewalls. A significant and growing share of hosts are behind Network Address Translators (NATs), and proxies. Dealing with these practical issues is tedious, but crucial to adoption.

Inefficiency An overlay can not be as efficient as code running in every router. However, our observation is that when an overlay network is small, the inefficiency, measured in absolute terms, will be small as well -- and as the overlay network grows, its efficiency can approach the efficiency of router based services.

Information loss Because the overlay network is built on top of a network infrastructure (IP) that offers nearly complete connectivity (limited only by firewalls, NATs, and proxies), we expend considerable effort deducing the topology of the substrate network.

The first two of these problems can be addressed and nearly eliminated by careful design. To address management complexity, management of the entire overlay network can be concentrated at a single site. The key to a centralized-administration design is guaranteeing that newly installed nodes can boot and obtain network connectivity without intervention. Once that is accomplished, further instructions may be read from the central management server.

Firewalls, NATs and HTTP proxies complicate Overcast's operation in a number of ways. Firewalls force Overcast to open all connections "upstream" and to communicate using HTTP on port 80. This allows an Overcast network to extend exactly to those portions of the Internet that allow web browsing. NATs are devices used to multiplex a small set of IP addresses (often exactly one) over a number of clients. The clients are configured to use the NAT as their default router. At the NAT, TCP connections are rewritten to use one of the small number of IP addresses managed by the NAT. TCP port numbers allow the NAT to demultiplex return packets back to the correct client. The complication for Overcast is that client IP addresses are obscured. All Overcast nodes behind the NAT appear to have the same IP address. HTTP proxies have the same effect.

Although private IP addresses are never directly used by external Overcast nodes, there are times when an external node must correctly report the private IP address of another node. For example, an external node may have internal children. During tree building a node must report its children's addresses so that they may be measured for suitability as parents themselves. Only the private address is suitable for such purposes. To alleviate this complication all Overcast messages contain the sender's IP address in the payload of the message.

The final two disadvantages are not so easily dismissed. They represent the true tradeoff between overlay networks and ubiquitous router based software. For Overcast, the goal of instant deployment is important enough to sacrifice some measure of efficiency. However, the amount of inefficiency introduced is a key metric by which Overcast should be judged.

3.2 SINGLE-SOURCE MULTICAST

Overcast is a single-source multicast system. This contrasts with IP Multicast which allows any member of a multicast group to send packets to all other members of the group. Beyond the fact that this closely models our intended application domain, there are a number of reasons to pursue this particular refinement to the IP Multicast model.

Simplicity Both conceptually and in implementation, a single-source system is simpler than an any source model. For example, a single-source provides an obvious rendezvous point for group joins.

Optimization It is difficult to optimize the structure of the overlay network without intimate knowledge of the substrate network topology. This only becomes harder if the structure must be optimized for all paths.

Address space Single-source multicast groups provide a convenient alternative to the limited IP Multicast address space. The namespace can be partitioned by first naming the source, then allowing further subdivision of the source's choosing. In contrast, IP Multicast's address space is limited, and without obvious administration to avoid collisions amongst new groups.

On the other hand, a single-source model clearly offers reduced functionality compared to a model that allows any group member to multicast. As such, Overcast is not appropriate for applications that require extensive use of such a model. However, many applications which appear to need multi-source multicast, such as a distributed lecture allowing questions from the class, do not. In such an application, only one "non-root" sender is active at any particular time. It would be a simple matter for the sender to unicast to the root, which would then perform the true multicast on the behalf of the sender. A number of projects have used or advocated such an approach.

3.3 BANDWIDTH OPTIMIZATION

Overcast is designed for distribution from a single source. As such, small latencies are expected to be of less importance to its users than increased bandwidth. Extremely low latencies are only important for applications that are inherently two-way, such as video conferencing. Overcast is designed with the assumption that broadcasting "live" video on the Internet may actually mean broadcasting with a ten to fifteen second delay. Overcast distribution trees are built with the sole goal of creating high bandwidth channels from the source to all nodes. Although Overcast makes no guarantees that the topologies created are optimal, our simulations show that they perform quite well. The exact method by which high-bandwidth distribution trees are created and maintained is described in Section 4.2.

3.4 DEPLOYMENT

An important goal for Overcast is to be deployable on today's Internet infrastructure. This motivates not only the use of an overlay network, but many of its details. In particular, deployment must require little or no human intervention, costs per node should be minimized, and unmodified HTTP clients must be able to join multicast groups in the Overcast network.

To help ease the human costs of deployment, nodes in the Overcast network configure themselves in an adaptive distributed tree with a single root. No human intervention is required to build efficient distribution trees, and nodes can be a part of multiple distribution trees. Overcast's implementation on commodity PCs running Linux further eases deployment. Development is speeded by the familiar programming environment, and hardware costs are minimized by continually tracking the best price/performance ratio available in off-the-shelf hardware. The exact hardware configuration we have deployed has changed many times in the year or so that we have deployed Overcast nodes.

The final consumers of content from an Overcast network are HTTP clients. The Overcast protocols are carefully designed so that unmodified Web browsers can become members of a multicast group. In Overcast, a multicast group is represented as an HTTP URL: the hostname portion names the root of an Overcast network and the path represents a particular group on the network. All groups with the same root share a single distribution tree.

Using URLs as a namespace for Overcast groups has three advantages. First, URLs offer a hierarchical namespace, addressing the scarcity of multicast group names in traditional IP Multicast. Second, URLs and the means to access them are an existing standard. By delivering data over a simple HTTP connection, Overcast is able to bring multicasting to unmodified applications. Third, a URL's richer structure allows for simple expression of the increased power of Overcast over tradition multicast. For example, a group suffix of start1 Os may be defined to mean "begin the content stream 10 seconds from the beginning."

3.5 EXAMPLE USAGE

We have used Overcast to build a content distribution application for high-quality video and live streams. The application is built out of a publishing station (called a studio) and nodes (called appliances). Appliances are installed at strategic locations in their network. The appliances boot, contact their studio, and self-organize into a distribution tree, as described below. No local administration is required.

The studio stores content and schedules it for delivery to the appliances. Typically, once the content is delivered, the publisher at the studio generates a web page announcing the availability of the content. When a user clicks on the URL for published content, Overcast redirects the request to a nearby appliance and the appliance serves the content. If the content is video, no special streaming software is needed. The user can watch the video over standard protocols and a standard MPEG player, which is supplied with most browsers.

An administrator at the studio can control the overlay network from a central point. She can view the status of the network (e.g., which appliances are up), collect statistics, control bandwidth consumption, etc.

Using this system, bulk data can be distributed efficiently, even if the network between the appliances and the studio consists of low-bandwidth or intermittent links. Given the relative prices of disk space and network bandwidth, this solution is far less ex- pensive than upgrading all network links between the studio and every client.

4 PROTOCOLS

The previous section described the structure and properties of the Overcast overlay network. This section describes how it functions: the initialization of individual nodes, the construction of the distribution hierarchy, and the automatic maintenance of the network. In particular, we describe the "tree "protocol to build distribution trees and the "up/down" protocol to maintain the global state of the Overcast network efficiently. We close by describing how clients (web browsers) join a group and how reliable multicasting to clients is performed.

4.1 INITIALIZATION

When a node is first plugged in or moved to a new location it automatically initializes itself and contacts the appropriate Overcast root(s). The first step in the initialization process is to determine an IP address and gateway address that the node can use for general IP connectivity. If there is a local DHCP server then the node can obtain IP configuration directly data using the DHCP protocol. If DHCP is unavailable, a utility program can be used from a nearby workstation for manual configuration.

Once the node has an IP configuration it contacts a global, well-known registry, sending along its unique serial number. Based on a node's serial number, the registry provides a list of the Overcast networks the node should join, an optional permanent IP configuration, the network areas it should serve, and the access controls it should implement. If a node is intended to become part of a particular content distribution network, the configuration data returned will be highly specific. Otherwise, default values will be returned and the networks to which a node will join can be controlled using a web-based GUI.

4.2 THE TREE BUILDING PROTOCOL

Self-organization of appliances into an efficient, robust distribution tree is the key to efficient operation in Overcast. Once a node initializes, it begins a process of self- organization with other nodes of the same Overcast network. The nodes cooperatively build an overlay network in the form of a distribution tree with the root node at its source. This section describes the tree-building protocol. As described earlier, the virtual links of the overlay network are the only paths on which data is exchanged. Therefore the choice of distribution tree can have a significant impact on the aggregate communication behavior of the overlay network. By carefully building a distribution tree, the network utilization of content distribution can be significantly reduced. Overcast stresses bandwidth over other conceivable metrics, such as latency, because of its expected applications. Overcast is not intended for interactive applications, therefore optimizing a path to shave small latencies at the expense of total throughput would be a mistake. On the other hand, Overcast's architecture as an overlay network allows this decision to be revisited. For instance, it may be decided that trees should have a fixed maximum depth to limit buffering delays.

The goal of Overcast's tree algorithm is to maximize bandwidth to the root for all nodes. At a high level the algorithm proceeds by placing a new node as far away from the root as possible without sacrificing bandwidth to the root. This approach leads to "deep" distribution trees in which the nodes nonetheless observe no worse bandwidth than obtaining the content directly from the root. By choosing a parent that is nearby in the network, the distribution tree will form along the lines of the substrate network topology.

The tree protocol begins when a newly initialized node contacts the root of an Overcast group. The root thereby becomes the current node. Next, the new node begins a series of rounds in which it will attempt to locate itself further away from the root withou sacrificing bandwidth back to the root. In each round the new node considers its bandwidth to current as well as the bandwidth to current through each of current's children. If the bandwidth through any of the children is about as high as the direct bandwidth to current, then one of these children becomes current and a new round commences. In the case of multiple suitable children, the child closest (in terms of network hops) to the searching node is chosen. If no child is suitable, the search for a parent ends with current.

To approximate the bandwidth that will be observed when moving data, the tree protocol measures the download time of 10 Kbytes. This measurement includes all the costs of serving actual content. We have observed that this approach to measuring bandwidth gives us better results than approaches based on low-level bandwidth measurements such as using ping. On the other hand, we recognize that a 10 Kbyte message is too short to accurately reflect the bandwidth of "long fat pipes". We plan to move to a technique that uses progressively larger measurements until a steady state is observed.

When the measured bandwidths to two nodes are within 10% of each other, we consider the nodes equally good and select the node that is closest, as reported by traceroute. This avoids frequent topology changes between two nearly equal paths, as well as decreasing the total number of network links used by the system.

A node periodically reevaluates its position in the tree by measuring the bandwidth to its current siblings (an up-to-date list is obtained from the parent), parent, and grandparent. Just as in the initial building phase, a node will relocate below its siblings if that does not decrease its bandwidth back to the root. The node checks bandwidth directly to the grandparent as a way of testing its previous decision to locate under its current parent. If necessary the node moves back up in the hierarchy to become a sibling of its parent. As a result, nodes constantly reevaluate their position in the tree and an Overcast network is inherently tolerant of nonroot node failures. If a node goes offline for some reason, any nodes that were below it in the tree will reconnect themselves to the rest of the routing hierarchy. When a node detects that its parent is unreachable, it will simply relocate beneath its grandparent. If its grandparent is also unreachable the node will continue to move up its ancestry until it finds a live node. The ancestor list also allows cycles to be avoided as nodes asynchronously choose new parents. A node simply refuses to become the parent of a node it believes to be it's own ancestor. A node that chooses such a node will forced to rechoose.

While there is extensive literature on faster fail-over algorithms, we have not yet found a need to optimize beyond the strategy outlined above. It is important to remember that the nodes participating in this protocol are dedicated machines that are less prone to failure than desktop computers. If this becomes an issue, we have considered extending the tree building algorithm to maintain backup parents (excluding a node's own ancestry from consideration) or an entire backup tree.

By periodically remeasuring network performance, the overlay network can adapt to network conditions that manifest themselves at time scales larger than the frequency at which the distribution tree reorganizes. For example, a tree that is optimized for bandwidth efficient content delivery during the day may be significantly suboptimal during the overnight hours (when network congestion is typically lower). The ability of the tree protocol to automatically adapt to these kinds of changing network conditions provides an important advantage over simpler, statically configured content distribution schemes.

4.3 THE UP/DOWN PROTOCOL

To allow web clients to join a group quickly, the Overcast network must track the status of the Overcast nodes. It may also be important to report statistical information back to the root, so that content providers might learn, for instance, how often certain content is being viewed. This section describes a protocol for efficient exchange of information in a tree of network nodes to provide the root of the tree with information from nodes throughout the network. For our needs, this protocol must scale sublinearly in terms of network usage at the root, but may scale linearly in terms of space (all with respect to the number of Overcast nodes). This is a simple result of the relative requirements of a client for these two resources and the cost of those resources. Overcast might store (conservatively) a few hundred bytes about each Overcast node, but even in a group of millions of nodes, total RAM cost for the root would be under $1,000. We call this protocol the "up/down" protocol because our current system uses it mainly to keep track of what nodes are up and what nodes are down. However, arbitrary information in either of two large classes may be propagated to the root. In particular, if the information either changes slowly (e.g., up/down status of nodes), or the information can be combined efficiently from multiple children into a single description (e.g., group membership counts), it can be propagated to the root. Rapidly changing information that can not be aggregated during propagation would overwhelm the root's bandwidth capacity.

Each node in the network, including the root node, maintains a table of information about all nodes lower than itself in the hierarchy and a log of all changes to the table. Therefore the root node's table contains up-to-date information for all nodes in the hierarchy. The table is stored on disk and cached in the memory of a node. The basis of the protocol is that each node periodically checks in with the node directly above it in the tree. If a child fails to contact its parent within a preset interval, the parent will assume the child and all its descendants have "died". That is, either the node has failed, an intervening link has failed, or the child has simply changed parents. In any case, the parent node marks the child and its descendants "dead" in its table. Parents never initiate contact with descendants. This is a byproduct of a design that is intended to cross rewalls easily. All node failures must be detected by a failure to check in, rather than active probing.

During these periodic check-ins, a node reports new information that it has observed or been informed of since it last checked in. This includes:

"Death certificates"—Children that have missed their expected report time.

"Birth certificates"—Nodes that have become children of the reporting node.

Changes to the reporting node's "extra information".

Certificates or changes that have been propagated to the node from its own children since its last checkin.

This simple protocol exhibits a race condition when a node chooses a new parent. The moving node's former parent propagates a death certificate up the hierarchy, while at nearly the same time the new parent begins propagating a birth certificate up the tree. If the birth certificate arrives at the root first, when the death certificate arrives the root will believe that the node has failed. This inaccuracy will remain indefinitely since a new birth certificate will only be sent in response to a change in the hierarchy that may not occur for an arbitrary period of time.

To alleviate this problem, a node maintains a sequence number indicating of how many times it has changed parents. All changes involving a node are tagged with that number. A node ignores changes that are reported to it about a node if it has already seen a change with a higher sequence number. For instance, a node may have changed parents 17 times.

When it changes again, its former parent will propagate a death certificate annotated with 17. However, its new parent will propagate a birth certificate annotated with 18. If the birth certificate arrives first, the death certificate will be ignored since it is older. An important optimization to the up/down protocol avoids large sets of birth certificates from arriving at the root in response to a node with many descendants choosing a new parent. Normally, when a node moves to a new parent, a birth certificate must be sent out for each of its descendants to its new parent. This maintains the invariant that a node knows the parent of all its descendants. Keep in mind that a birth certificate is not only a record that a node exists, but that it has a certain parent.

Although this large set of updates is required, it is usually unnecessary for these updates to continue far up the hierarchy. For example, when a node relocates beneath a sibling, the sibling must learn about all of the node's descendants, but when the sibling, in turn, passes these certificates to the original parent, the original parent notices that they do not represent a change and quashes the certificate from further propagation.

Using the up/down protocol, the root of the hierarchy will receive timely updates about changes to the network. The freshness of the information can be tuned by varying the length of time between check-ins. Shorter periods between updates guarantee that information will make its way to the root more quickly. Regardless of the update frequency, bandwidth requirements at the root will be proportional to the number of changes in the hierarchy rather than the size of the hierarchy itself.

4.4 REPLICATING THE ROOT

In Overcast, there appears to be the potential for significant scalability and reliability problems at the root. The up/down protocol works to alleviate the scalability difficulties in maintaining global state about the distribution tree, but the root is still responsible for handling all join requests from all HTTP clients. The root handles such requests by redirection, which is far less resource intensive than actually delivering the requested content. Nonetheless, the possibility of overload remains for particularly popular groups. The root is also a single point of failure.

To address this, overcast uses a standard technique used by many popular websites. The DNS name of the root resolves to any number of replicated roots in round-robin fashion. The database used to perform redirections is replicated to all such roots. In addition, IP address takeover may be used for immediate failover, since DNS caching may cause clients to continue to contact a failed replica. This simple, standard technique works well for this purpose because handling joins from HTTP clients is a read-only operation that lends well to distribution over numerous replicas.

There remains, however, a single point of failure for the up/down protocol. The functionality of the root in the up/down protocol cannot be distributed so easily because its purpose is to maintain changing state. However the up/down protocol has the useful property that all nodes maintain state for nodes below them in the distribution tree. Therefore, a convenient technique to address fault tolerance is to specially construct the top of the hierarchy.

Figure 8:
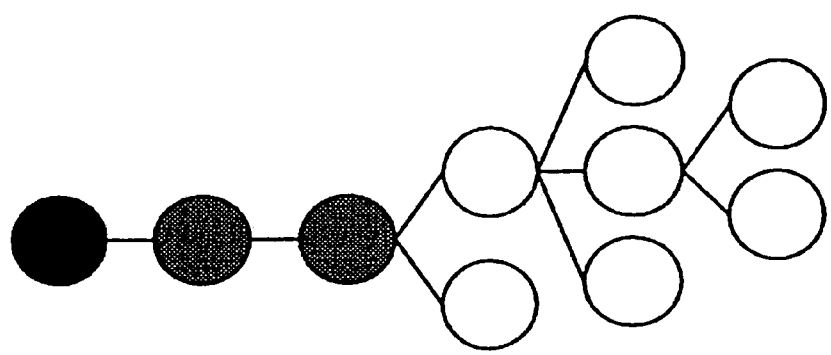
FIG. 8 is a diagram of a distribution tree.

Starting with the root, some number of nodes are configured linearly, that is, each has only one child. In this way all other overcast nodes lie below these top nodes. FIG. 8 shows a distribution tree in which the top three nodes are arranged linearly. Each of these nodes has enough information to act as the root of the up/down protocol in case of a failure. Specifically, the distribution topology is specially configured to allow either of the grey nodes to quickly stand in as the root (black) node. All filled nodes have complete status information about the unfilled nodes. This technique has the drawback of increasing the latency of content distribution unless special-case code skips the extra roots during distribution. If latency were important to Overcast this would be an important, but simple, optimization.

"Linear roots"work well with the need for replication to address scalability, as mentioned above. The set of linear nodes has all the information needed to perform Overcast joins, therefore these nodes are perfect candidates to be used in the DNS round-robin approach to scalability. By choosing these nodes, no further replication is necessary.

4.5 JOINING A MULTICAST GROUP

To join a multicast group, a Web client issues an HTTP GET request with the URL for a group. The hostname of the URL names the root node(s). The root uses the pathname of the URL, the location of the client, and its database of the current status of the Overcast nodes to decide where to connect the client to the multicast tree. Because status information is constantly propagated to the root, a decision may be made quickly without further network traffic, enabling fast joins.

Joining a group consists of selecting the best server and redirecting the client to that server. The details of the server selection algorithm are beyond the scope of this paper as considerable previous work exists in this area. Furthermore, Overcast's particular choices are constrained considerably by a desire to avoid changes at the client. Without such a constraint simpler choices could have been made, such as allowing clients to participate directly in the Overcast tree building protocol.

Although we do not discuss server selection here, a number of Overcast's details exist to support this important functionality, however it may actually be implemented. A centralized root performing redirections is convenient for an approach involving large tables containing collected Internet topology data. The up/down algorithm allows for redirections to nodes that are known to be functioning.

4.6 MULTICASTING WITH OVERCAST

We refer to reliable multicasting on an overcast network as "overcasting". Overcasting proceeds along the distribution tree built by the tree protocol. Data is moved between parent and child using TCP streams. If a node has four children, four separate connections are used. The content may be pipelined through several generations in the tree. A large file or a long-running live stream may be in transit over tens of different TCP streams at a single moment, in several layers of the distribution hierarchy.

If a failure occurs during an overcast, the distribution tree will rebuild itself as described above. After rebuilding the tree, the overcast resumes for on-demand distributions where it left off. In order to do so, each node keeps a log of the data it has received so far. After recovery, a node inspects the log and restarts all overcasts in progress.

Live content on the Internet today is typically buffered before playback. This compensates for momentary glitches in network throughput. Overcast can take advantage of this buffering to mask the failure of a node being used to Overcast data. As long as the failure occurs in a node that is not at the edge of the Overcast network, an HTTP client need not ever become aware that the path of data from the root has been changed in the face of failure.

5 EVALUATION

In this section, the protocols presented above are evaluated by simulation. Although we have deployed Overcast in the real world, we have not yet deployed on a sufficiently large network to run the experiments we have simulated.

To evaluate the protocols, an overlay network is simulated with increasing numbers of overcast nodes while keeping the total number of network nodes constant. Overcast should build better trees as more nodes are deployed, but protocol overhead may grow.

We use the Georgia Tech Internet work Topology Models (GT-ITM) to generate the network topologies used in our simulations. We use the "transit-stub" model to obtain graphs that more closely resemble the Internet than a pure random construction. GT-ITM generates a transit-stub graph in stages, first a number of random backbones (transit domains), then the random structure of each back-bone, then random "stub" graphs are attached to each node in the backbones.

We use this model to construct five different 600 node graphs. Each graph is made up of three transit domains. These domains are guaranteed to be connected. Each transit domain consists of an average of eight stub networks. The stub networks contain edges amongst themselves with a probability of 0.5. Each stub network consists of an average of 25 nodes, in which nodes are once again connected with a probability of 0.5. These parameters are from the sample graphs in the GT-ITM distribution; we are unaware of any published work that describes parameters that might better model common Internet topologies.

We extended the graphs generated by GT-ITM with bandwidth information. Links internal to the transit domains were assigned a bandwidth of 45Mbits's, edges connecting stub networks to the transit domains were assigned 1.5Mbits's, finally, in the local stub domain, edges were assigned 100Mbit's. These re commonly used network technology: T3s, T1s, and Fast Ethernet. All measurements are averages over the five generated topologies.

Empirical measurements from actual Overcast nodes show that a single Overcast node can easily support twenty clients watching MPEG-1 videos, though the exact number is greatly dependent on the bandwidth requirements of the content. Thus with a network of 600 overcast nodes, we are simulating multicast groups of perhaps 12,000 members.

5.1 TREE PROTOCOL

The efficiency of Overcast depends on the positioning of Overcast nodes. In our first experiments, we compare two different approaches to choosing positions. The first approach, labelled "Backbone", preferentially chooses transit nodes to contain Overcast nodes. Once all transit nodes are Overcast nodes, additional nodes are chosen at random. This approach corresponds to a scenario in which the owner of the Overcast nodes places them strategically in the network. In the second, labelled "Random", we select all Overcast nodes at random. This approach corresponds to a scenario in which the owner of Overcast nodes does not pay attention to where the nodes are placed.

Figure 9:
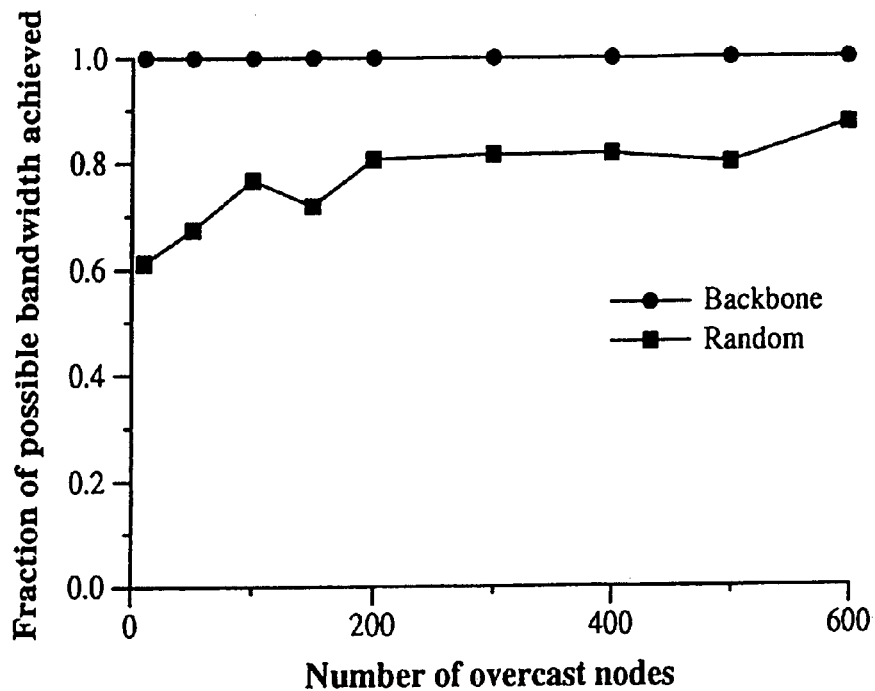
FIG. 9 is a plot of bandwidth versus number of Overcast nodes.

The goal of Overcast's tree-building protocol is to optimize the bottleneck bandwidth available back to the root for all nodes. The goal is to provide each node with the same bandwidth to the root that the node would have in an idle network. FIG. 9 compares the sum of all nodes' bandwidths back to the root in Overcast networks of various sizes to the sum of all nodes' bandwidths back to the root in an optimal distribution tree using router-based software. This indicates how well Overcast performs compared to IP Multicast.

The main observation is that, as expected, the backbone strategy for placing Overcast nodes is more effective than the random strategy, but the results of random placement are encouraging nonetheless. Even a small number of deployed Overcast nodes, positioned at random, provide approximately 70%–80% of the total possible bandwidth.

It is extremely encouraging that, when using the backbone approach, no node receives less bandwidth under Overcast than it would receive from IP Multicast. However some enthusiasm must be withheld, because a simulation artifact has been left in these numbers to illustrate a point.

Notice that the backbone approach and the random approach differ in effectiveness even when all 600 nodes of the network are Overcast nodes. In this case the same nodes are participating in the protocol, but better trees are built using the backbone approach. This illustrates that the trees created by the tree-building protocol are not unique. The backbone approach fares better by this metric because in our simulations backbone nodes were turned on first. This allowed backbone nodes to preferentially form the "top" of the tree. This indicates that in future work it may be beneficial to extend the tree-building protocol to accept hints that mark certain nodes as "backbone" nodes. These nodes would preferentially form the core of the distribution tree. Overcast appears to perform quite well for its intended goal of optimizing available bandwidth, but it is reasonable to wonder what costs are associated with this performance.

Figure 10:
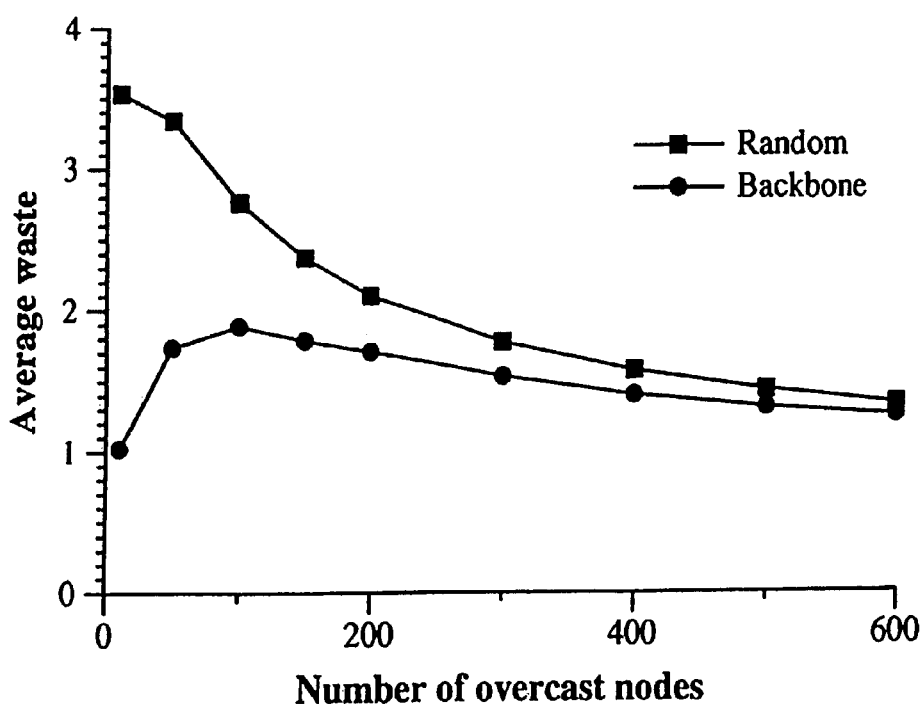
FIG. 10 is a plot of average waste versus number of Overcast nodes.

To explore this question we measure the network load imposed by Overcast. We define network load to be the number of times that a particular piece of data must traverse a network link to reach all Overcast nodes. In order to compare to IP Multicast, FIG. 4 10 plots the ratio of the network load imposed by Overcast to a lower bound estimate of IP Multicast's network load. For a given set of nodes, we assume that IP Multicast would require exactly one less link than the number of nodes. This assumes that all nodes are one hop away from another node, which is unlikely to be true in sparse topologies, but provides a lower bound for comparison.

FIG. 4 10 shows that for Overcast networks with greater than 200 nodes Overcast imposes somewhat less than twice as much network load as IP Multicast. In return for this extra load Overcast offers reliable delivery, immediate deployment, and future flexibility. For networks with few Overcast nodes, Overcast appears to impose a considerably higher network load than IP Multicast. This is a result of our optimistic lower bound on IP Multicast's network load, which assumes that 50 randomly placed nodes in a 600 node network can be spanned by 49 links.

Another metric to measure the effectiveness of an application-level multicast technique is stress, proposed in. Stress indicates the number of times that the same data traverses a particular physical link. By this metric, Overcast performs quite well with average stresses of between 1 and 1.2. We do not present detailed analysis of Overcast's performance by this metric, however, because we believe that network load is more telling for Overcast. That is, Overcast has quite low scores for average stress, but that metric does not describe how often a longer route was taken when a shorter route was available.

Another question is how fast the tree protocol converges to a stable distribution tree, assuming a stable underlying network. This is dependent on three parameters. The round period controls how long a node that has not yet determined a stable position in the hierarchy will wait before evaluating a new set of potential parents. The reevaluation period determines how long a node will wait before reevaluating its position in the hierarchy once it has obtained a stable position. Finally the lease period determines how long a parent will wait to hear from a child before reporting the child's death.

Figure 11:
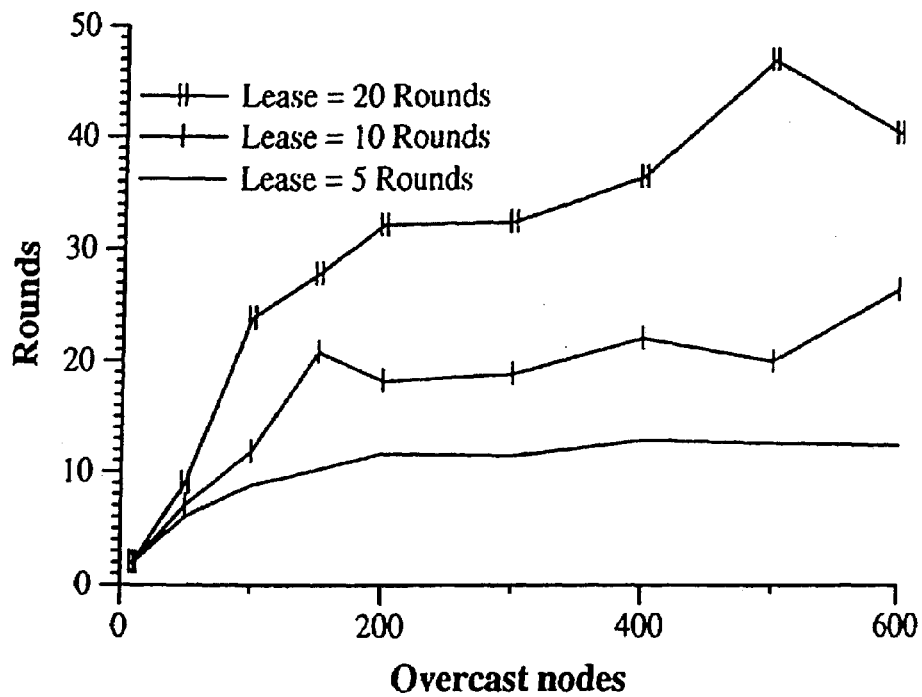
FIG. 11 is a plot of number of rounds versus number of Overcast nodes.

For convenience, we measure all convergence times in terms of the fundamental unit, the round time. We also set the reevaluation period and lease period to the same value. FIG. 11 shows how long Overcast requires to converge if an entire Overcast network is simultaneously activated. To demonstrate the effect of a changing reevaluation and lease period, we plot for the "standard" lease time—10 rounds, as well as longer and shorter periods. Lease periods shorter than five rounds are impractical because children actually renew their leases a small random number of rounds (between one and three) before their lease expires to avoid being thought dead. We expect that a round period on the order of 1–2 seconds will be practical for most applications.

We next measure convergence times for an existing Overcast network in which overcast nodes are added or fail. We simulate overcast networks of various sizes until they quiesce, add and remove Overcast nodes, and then simulate the network until it quiesces once again.

We measure the time, in rounds, for the network to quiesce after the changes. We measure for various numbers of additions and removals allowing us to assess the dependence of convergence on how many nodes have changed state. We measure only the backbone approach.

Figure 12:
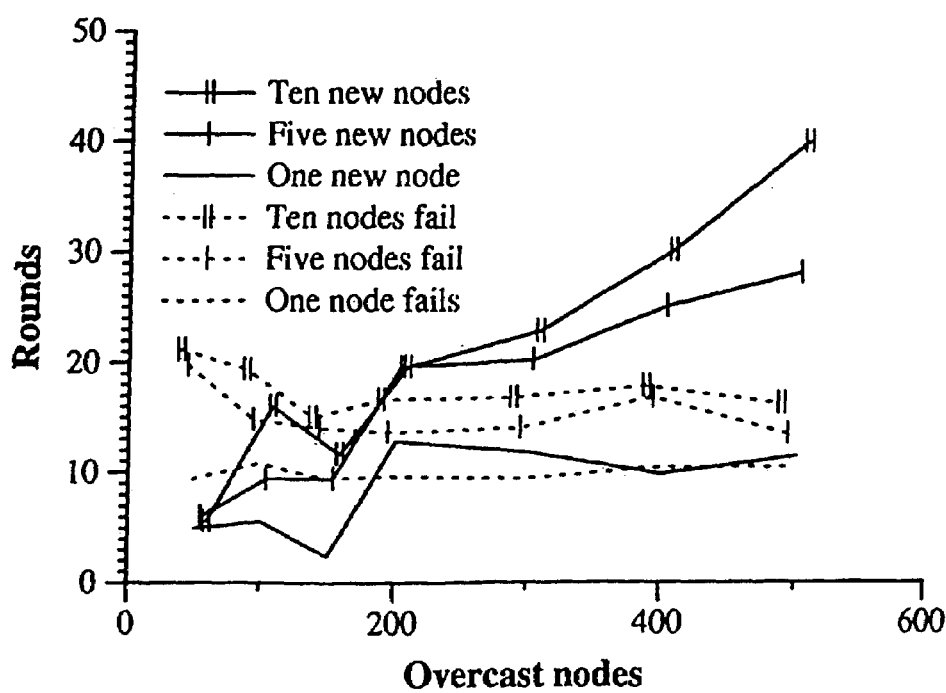
FIG. 12 is a plot of number of rounds versus versus number of Overcast nodes.

FIG. 12 plots convergence times (using a 10 round lease time) against the number of overcast nodes in the network. The convergence time for node failures is quite modest. In all simulations the Overcast network reconverged after less than three lease times. Furthermore, the reconvergence time scaled well against both the number of nodes failing and the total number of nodes in the overcast network. In neither case was the convergence time even linearly affected.

For node additions, convergence times do appear more closely linked to the size of the Overcast network. This makes intuitive sense because new nodes are navigating the network to determine their best location. Even so, in all simulations fewer than five lease times are required. It is important to note that an Overcast network continues to function even while stabilizing. Performance may be somewhat impacted by increased measurement traffic and by TCP setup and tear down overhead as parents change, but such disruptions are localized.

5.2 UP/DOWN PROTOCOL

The goal of the up/down algorithm is to minimize the bandwidth required at the root node while maintaining timely status information for the entire network. Factors that affect the amount of bandwidth used include the size of the overcast network and the rate of topology changes. Topology changes occur when the properties of the underlying network change, nodes fail, or nodes are added. Therefore the up/down algorithm is evaluated by simulating overcast networks of various sizes in which various numbers of failures and additions occur.

To assess the up/down protocol's ability to provide timely status updates to the root without undue overhead we keep track of the number of certificates (for both "birth" and "death") that reach the root during the previous convergence tests. This is indicative of the bandwidth required at the root node to support an overcast network of the given size and is dependent on the amount of topology change induced by the additions and deletions.

Figure 13:
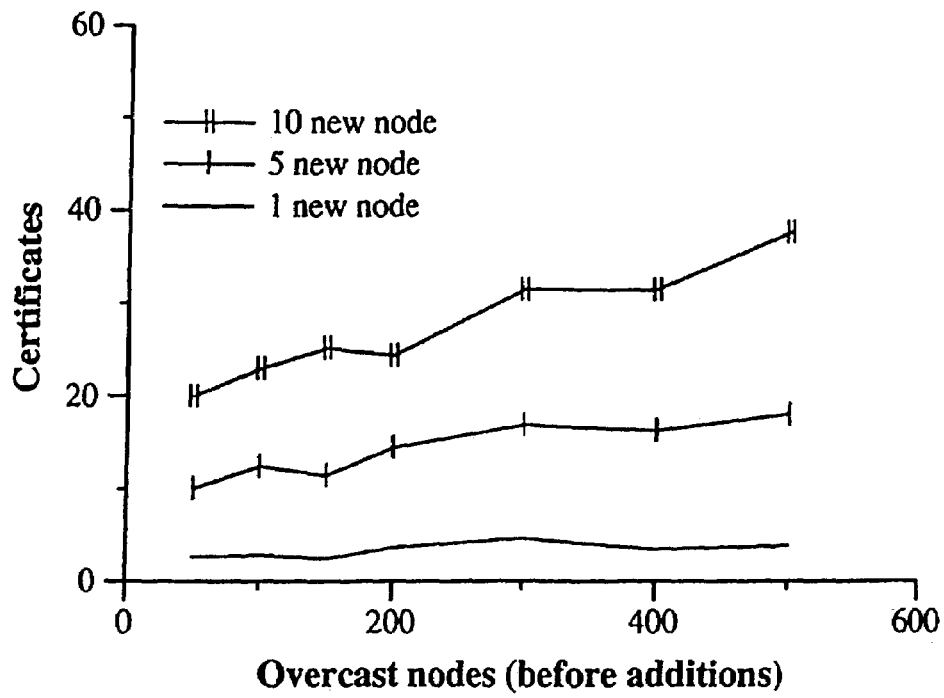
FIG. 13 is a plot of number of certificates versus number of Overcast nodes.

FIG. 13 graphs the number of certificates received by the root node in response to new nodes being brought up in the overcast network. Remember, the root may receive multiple certificates per node addition because the addition is likely to cause some topology reconfiguration. Each time a node picks a new parent that parent propagates a birth certificate. These results indicate that the number of certificates is quite modest: certainly no more than four certificates per node addition, usually approximately three. What is more important is that the number of certificates scales more closely to the number of new nodes than the size of the overcast network. This gives evidence that overcast can scale to large networks.

Figure 14:
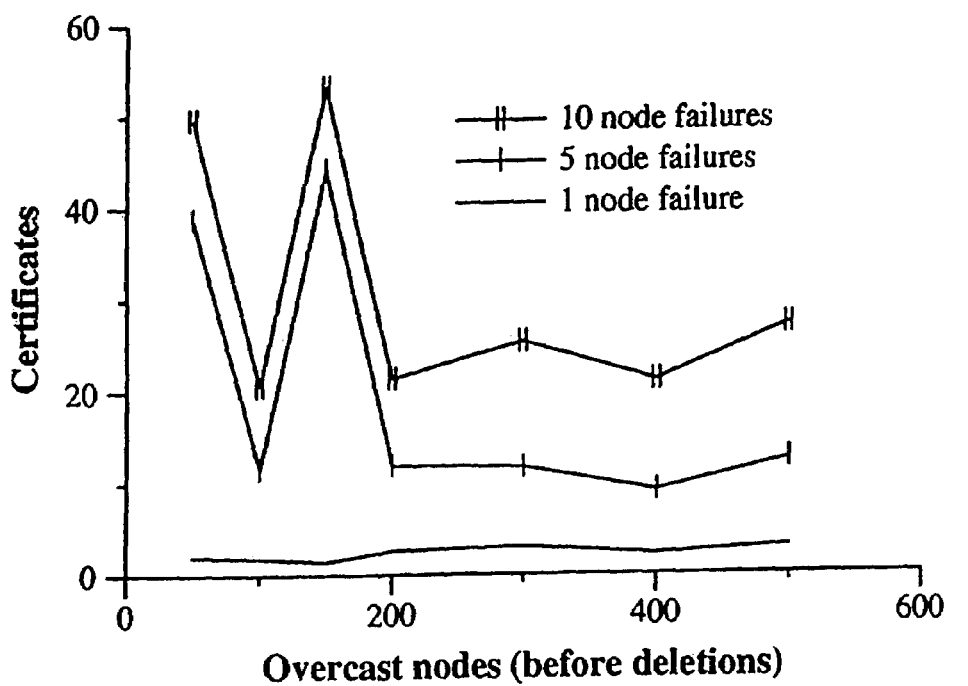
FIG. 14 is a plot of number of certificates versus number of Overcast nodes.

Similarly, Overcast requires few certificates to react to node failures. FIG. 14 shows that in the common case, no more than four certificates are required per node failure. Again, because the number of certificates is proportional to the number of failures rather than the size of the network, Overcast appears to offer the ability to scale to large networks.

On the other hand, FIG. 14 shows that there are some cases that fall far outside the norm. The large spikes at 50 and 150 node networks with 5 and 10 failures occurred because of failures that happened to occur near the root. When a node with a substantial number of children chooses a new parent it must convey it's entire set of descendants to its new parent. That parent then propagates the entire set. However, when the information reaches a node that already knows the relationships in question, the update is quashed. In these cases, because the reconfigurations occurred high in the tree there was no chance to quash the updates before they reached the root. In larger networks such failures are less likely.

6 CONCLUSIONS

We have described a simple tree-building protocol that yields bandwidth-efficient distribution trees for single-source multicast and our up/down protocol for providing timely status updates to the root of the distribution tree in scalable manner. Overcast implements these protocols in an overlay network over the existing Internet. The protocols allow Overcast networks to dynamically adapt to changes (such as congestion and failures) in the underlying network infrastructure and support large, reliable single- source multicast groups. Geographically-dispersed businesses have deployed Overcast nodes in small-scale Overcast networks for distribution of high- quality, on- demand video to unmodified desktops.

Simulation studies with topologies created with the Georgia Tech Internet work Topology Models show that Overcast networks work well on large-scale networks, supporting multicast groups of up to 12,000 members. Given these results and the low cost for Overcast nodes, we believe that putting computation and storage in the network fabric is a promising approach for adding new services to the Internet incrementally.

What is claimed is:

1. A method for maintaining a map of node relationships for a network of related nodes, the method comprising the steps of:
   detecting a change of a relationship between a first network node and a second network node having a child relationship to the first network node, the first network node being a parent to the second network node;
   generating a change relationship signal indicating the change of the relationship between the first network node and the second network node; and
   transmitting the change relationship signal, having a change sequence number, to a parent node of the first network node so that the parent node receives an update of a state of the relationship between the first network node and the second network node.

2. The method of claim 1, further comprising the step of:
   selectively updating a map of node relationships based on the change relationship signal having the sequence number operable for comparison with previously received sequence numbers such that the map of node relationships indicates the state of the relationship between the first network node and the second network node.

3. The method of claim 1, further comprising the steps of:
   receiving a propagated change relationship signal indicating a change in a relationship between two network nodes other than the first network node; and
   transmitting the propagated change relationship signal to the parent node, so that the parent node receives an update of a state of the relationship between the two network nodes.

4. The method of claim 3, further comprising the step of:
   updating the map of node relationships based on the propagated change relationship signal such that the map of node relationships indicates the state of the relationship between the two network nodes other than the first network node.

5. The method of claim 1, further comprising the steps of:
receiving a plurality of propagated change relationship signals indicating a change of relationship between two network nodes, each propagated change relationship signal having a sequence number;
comparing the sequence numbers for the propagated change relationship signals;
selecting one of the propagated change relationship signals with which to update the map of node relationships based on the step of comparing the sequence numbers; and
transmitting the selected one of the propagated change relationships signals to the parent node, so that the parent node receives an update of a state of relationship between the two network nodes.

6. The method of claim 1, wherein the change relationship signal is a termination signal indicating the termination of the relationship between the first network node and the second network node.

7. The method of claim 1, wherein the change relationship signal is a creation signal indicating the creation of the relationship between the first network node and the second network node.

8. The method of claim 1, wherein the step of detecting the change of the relationship comprises initiating a check-in communication from the second network node to the first network node.

9. A method for maintaining a map of node relationships for a network of related nodes, the method comprising the steps of:
detecting a change of a relationship between a first network node and a second network node having a child relationship to the first network node, the first network node being a parent to the second network node;
generating a change relationship signal indicating the change of the relationship between the first network node and the second network node, generating the change relationship signal further comprising generating the change relationship signal having a sequence number indicating a number of relationship changes of the second network node, the sequence number representing a count of parents of the second network node; and
transmitting the change relationship signal to a parent node of the first network node so that the parent node receives an update of a state of the relationship between the first network node and the second network node.

10. A computer system comprising:
a processor;
a memory; and
an interconnection mechanism coupling the processor and the memory;
wherein the memory is encoded with logic instructions for a map maintainer application that, when performed on the processor, cause the processor to form a map maintainer that maintains a map of node relationships for the network by performing the operations of:
detecting by the processor a change of a relationship between a first network node and a second network node having a child relationship to the parent first network node;
generating a change relationship signal, the change relationship signal having a change sequence number, in the memory indicating the change of the relationship between the first network node and the second network node; and
transmitting the change relationship signal to a parent node of the first network node so that the parent node receives an update of a state of the relationship between the first network node and the second network node.

11. The computer system of claim 10, wherein the logic instructions for the map maintainer application comprise further logic instructions that, when performed on the processor, cause the map maintainer to perform the operation of selectively updating the map of node relationships based on the change relationship signal, the change relationship signal having the sequence number operable for comparison with previously received sequence numbers such that the map of node relationships indicates the state of the relationship between the first network node and the second network node.

12. The computer system of claim 10, wherein the logic instructions for the map maintainer application comprise further logic instructions that, when performed on the processor, cause the map maintainer to perform the operations of:
receiving a propagated change relationship signal indicating a change in a relationship between two network nodes other than the first network node; and
transmitting the propagated change relationship signal to the parent node, so that the parent node receives an update of a state of the relationship between the two network nodes.

13. The computer system of claim 12, wherein the logic instructions for the map maintainer application comprise further logic instructions that, when performed on the processor, cause the map maintainer to perform the operation of updating the map of node relationships based on the propagated change relationship signal such that the map of node relationships indicates the state of the relationship between the two network nodes other than the first network node.

14. The computer system of claim 10, wherein the logic instructions for the map maintainer application comprise further logic instructions that, when performed on the processor, cause the map maintainer to perform the operations of:
receiving a plurality of propagated change relationship signals indicating a change of relationship between two network nodes, each propagated change relationship signal having a sequence number;
comparing the sequence numbers for the propagated change relationship signals;
selecting one of the propagated change relationship signals with which to update the map of node relationships based on the step of comparing the sequence numbers; and
transmitting the selected one of the propagated change relationships signals to the parent node, so that the parent node receives an update of a state of relationship between the two network nodes.

15. The computer system of claim 10, wherein the change relationship signal is a termination signal indicating the termination of the relationship between the first network node and the second network node.

16. The computer system of claim 10, wherein the change relationship signal is a creation signal indicating the creation of the relationship between the first network node and the second network node.

17. The computer system of claim 10, wherein the second network node initiates a check-in communication from the second network node to the first network node.

18. A computer system comprising:
- a processor;
- a memory; and
- an interconnection mechanism coupling the processor and the memory;
- wherein the memory is encoded with logic instructions for a map maintainer application that, when performed on the processor, cause the processor to form a map maintainer that maintains a map of node relationships for the network by performing the operations of:
  - detecting by the processor a change of a relationship between a first network node and a second network node having a child relationship to the parent first network node;
  - generating a change relationship signal in the memory indicating the change of the relationship between the first network node and the second network node, the change relationship signal having a sequence number indicating a number of relationship changes of the second network node, the sequence number representing a count of parents of the second network node; and
  - transmitting the change relationship signal to a parent node of the first network node so that the parent node receives an update of a state of the relationship between the first network node and the second network node.

19. A computer program product having computer program instructions stored in a tangible storage medium for maintaining a map of node relationships for a network, such that the instructions, when carried out by a computer, cause the computer to perform the steps of:
- detecting a change of a relationship between a first network node and a second network node having a child relationship to the parent first network node;
- generating a change relationship signal having a change sequence number indicating the change of the relationship between the first network node and the second network node; and
- transmitting the change relationship signal to a parent node of the first network node so that the parent node receives an update of a state of the relationship between the first network node and the second network node.

20. A computer system for maintaining a map of node relationships for a network of related nodes, the computer system comprising:
- means for detecting a change of a relationship between a first network node and a second network node having a child relationship to the parent first network node;
- means for generating a change relationship signal having a change sequence number indicating the change of the relationship between the first network node and the second network node; and
- means for transmitting the change relationship signal to a parent node of the first network node so that the parent node receives an update of a state of the relationship between the first network node and the second network node.

* * * * *